(12) United States Patent
Muñoz Muñoz et al.

(10) Patent No.: US 11,914,190 B2
(45) Date of Patent: Feb. 27, 2024

(54) OPTICAL-PHASED ARRAY BEAM-STEERER

(71) Applicant: HUAWEI TECHNOLOGIES CO., LTD., Shenzhen (CN)

(72) Inventors: Pascual Muñoz Muñoz, Valencia (ES); Daniel Pastor Abellán, Valencia (ES); Jesús Benítez González, Valencia (ES); Gloria Micó Cabanes, Puzol (ES); Luis Alberto Bru Orgiles, Valencia (ES); Dominic John Goodwill, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/581,045

(22) Filed: Jan. 21, 2022

(65) Prior Publication Data
US 2022/0236486 A1    Jul. 28, 2022

Related U.S. Application Data

(60) Provisional application No. 63/141,192, filed on Jan. 25, 2021.

(51) Int. Cl.
G02B 6/34       (2006.01)
G02B 6/28       (2006.01)
G02B 27/00      (2006.01)

(52) U.S. Cl.
CPC ............. *G02B 6/2804* (2013.01); *G02B 6/34* (2013.01); *G02B 27/0087* (2013.01)

(58) Field of Classification Search
CPC .... G02B 6/2804; G02B 6/34; G02B 27/0087; G02B 6/3548; G02B 6/355; G02B 6/12009; G02B 6/29301; G02F 1/292
See application file for complete search history.

(56) References Cited

U.S. PATENT DOCUMENTS 5,793,907 A    8/1998   Jalali et al.
6,442,308 B1   8/2002   Han et al.
(Continued)

FOREIGN PATENT DOCUMENTS

CN     105527772 A    4/2016
CN     108469651 A    8/2018
(Continued)

OTHER PUBLICATIONS

Li, Y., & Ibanez-Guzman, J. (2020) "Lidar for autonomous driving: The principles, challenges, and trends for automotive lidar and perception systems", IEEE Signal Processing Magazine, 37(4), 50-61.
(Continued)

*Primary Examiner* — John Bedtelyon

(57) ABSTRACT

An aspect of the disclosure provides for an optical-phased array (OPA) comprising a star coupler coupled to a plurality of grating couplers, wherein the star coupler comprises multiple inputs and multiple outputs. In some embodiments, each output of the star coupler is coupled to a grating coupler of the plurality of grating couplers. In some embodiments, the star coupler is coupled to the plurality of grating couplers by a plurality of optical delay lines. In some embodiments each output of the star coupler is coupled to a grating coupler of the plurality of grating couplers via an optical delay line of the plurality of optical delay lines. In some embodiments, the OPA further includes an optical switch coupled to the multiple inputs of the star coupler, and at least one tunable laser. Another aspect of the disclosure provides a method for steering light using the OPA.

18 Claims, 13 Drawing Sheets

(56) References Cited

U.S. PATENT DOCUMENTS

| | | | |
|---|---|---|---|
| 9,864,109 | B2 | 1/2018 | Lee et al. |
| 11,249,371 | B2 * | 2/2022 | Bogaerts ............... G02F 1/2955 |
| 2002/0131704 | A1 | 9/2002 | Doerr |
| 2005/0248829 | A1 | 11/2005 | Sawin et al. |
| 2016/0223723 | A1 | 8/2016 | Han et al. |
| 2017/0184881 | A1 | 6/2017 | Loertscher et al. |
| 2018/0059505 | A1 | 3/2018 | Kyoung et al. |
| 2018/0136542 | A1 | 5/2018 | Kim et al. |
| 2018/0149943 | A9 | 5/2018 | Puscasu |
| 2018/0366824 | A1 | 12/2018 | Shim et al. |
| 2019/0033682 | A1 | 1/2019 | Kafaie Shirmanesh et al. |
| 2019/0227350 | A1 | 7/2019 | Puckett et al. |

FOREIGN PATENT DOCUMENTS

| | | |
|---|---|---|
| CN | 110082906 A | 8/2019 |
| EP | 3428695 A1 | 1/2019 |
| WO | 2016187826 A1 | 12/2016 |

OTHER PUBLICATIONS

Van Acoleyen et al., "Two-Dimensional Dispersive Off-Chip Beam Scanner Fabricated on Silicon-On-Insulator", IEEE Photonics Technology Letters, vol. 23(17), 1270-1272, Sep. 1, 2011.

Bogaerts et al., Dispersive optical phased array circuit for high-resolution pixelated 2D far-field scanning controlled by a single wavelength variable, Proc. SPIE, Feb. 26, 2020.

Lopez et al., "MIT Spinoff Building New Solid-State Lidar-on-a-Chip System", IEEE Spectrum, Dec. 1, 2020.

Smit et al., "PHASAR-Based WDM-Devices: Principles, Design and Applications", IEEE Journal of Selected Topics in Quantum Electronics, vol. 2(2), Jun. 1996.

Trinh et al., "5×9 Integrated Optical Star Coupler in Silicon-on-Insulator Technology" IEEE Photonics Technology Letters, vol. 8(6), Jun. 1996.

Zou et al., "Performance Improvement for silicon-based arrayed waveguide grating router", Optices Express, vol. 25(9), May 1, 2017.

Tran, M. A., et al., "Tutorial on narrow linewidth tunable semiconductor lasers using Si/III-V heterogeneous integration", APL Photonics, 4(11), 111101, 2019.

Boller, K. J., et al., (Dec. 2019) "Hybrid integrated semiconductor lasers with silicon nitride feedback circuits", Photonics 2020, 7(4), 33 pages.

Zhu, Y., Zeng, et al., "Optical beam steering by using tunable, narrow-linewidth butt-coupled hybrid lasers in a silicon nitride photonics platform", Photonics Research, 8(3), 375-380, Mar. 2020.

Xiang, Chao, et al.,. "Ultra-narrow linewidth laser based on a semiconductor gain chip and extended Si3N4 Bragg grating," Opt. Lett. 44, 3825-3828 (2019).

Xiang, Chao, et al., "Narrow-linewidth III-V/Si/Si3N4 laser using multilayer heterogeneous integration," Optica 7, 20-21 (2020).

Fan, Youwen et al., "Hybrid integrated InP—Si3N4 diode laser with a 40-Hz intrinsic linewidth," Opt. Express, 28(15), 21713-21728 (2020).

van Rees, Albert, et al., "Ring resonator enhanced mode-hop-free wavelength tuning of an integrated extended-cavity laser," Opt. Express, 28(4), 5669-5683 (2020).

Tran, M. A., et al., "Ring-Resonator Based Widely-Tunable Narrow-Linewidth Si/InP Integrated Lasers," IEEE Journal of Selected Topics in Quantum Electronics, vol. 26, No. 2, pp. 1-14, Mar.-Apr. 2020.

Lesina et al., "Optical phased arrays for LIDAR: beam steering via tunable plasmonic metasurfaces." Oct. 24, 2019, pp. 1-19.

Surface Plasmon, Wikipedia, Nov. 20, 2019, https://en.wikipedia.org/wiki/Surface_plasmon.

Dionne et al., "Highly confined photon transport in subwavelength metallic slot waveguides." Nano Lett. 6, 1928-1932 (2006).

Huang et al., "Gate-Tunable Conducting Oxide Metasurfaces." Nano Lett. Aug. 26, 2016, 16(9), pp. 5319-5325.

Shirmanesh et al., "Dual-Gated Active Metasurface at 1550 nm with Wide (>300°) Phase Tunability." Nano Lett. Mar. 23, 2018, 18(5), 2957-2963.

Forouzmand et al., "Real-Time Controllable and Multifunctional Metasurfaces Utilizing Indium Tin Oxide Materials: A Phased Array Perspective." IEEE Transactions on Nanotechnology, vol. 16, No. 2, Mar. 2017, pp. 296-306.

* cited by examiner

800

---

802: transmitting light from a laser to multiple input waveguides of a star coupler, the star coupler comprising multiple inputs and outputs, the outputs having output waveguides.

↓

804: choosing a sub-field-of-view of a beam-steerer according to a desired scanning pattern.

↓

806: selecting an input of the star coupler corresponding to the sub-field-of-view.

↓

808: directing, via an optical switch, the light to the selected input of the star coupler, wherein the optical switch is coupled to the multiple inputs of the star coupler.

↓

810: delaying the light from each of the multiple outputs using a plurality of delay lines.

↓

812: optically coupling the multiple outputs to a plurality of grating couplers acting as a phased array.

↓

814: tuning the wavelength of the light over a wavelength range corresponding to the sub-field-of-view.

↓

816: steering light from the plurality of grating couplers according to the desired scanning pattern.

FIG. 8

OPTICAL-PHASED ARRAY BEAM-STEERER

CROSS-REFERENCE TO RELATED APPLICATIONS

This application claims the benefit of and priority to U.S. Provisional Application Ser. No. 63/141,192 filed Jan. 25, 2021, the entire contents of which are hereby incorporated by reference.

FIELD OF THE INVENTION

The present invention pertains to the field of optics, and in particular to an optical-phased array beam steerer.

BACKGROUND

Beam-steering has a number of applications, including in automotive lidars. While solid-state optical-phased arrays (OPA) beam-steerers may have advantages, such OPAs are yet to be demonstrated at practical scale. Beam-steering may also require precise controlling and good beam quality. A means of splitting input light to the emitting regions of the OPA may be needed. Although weighted tree splitters may be used to improve the beam quality, they require tight tolerances. Thermo-optic tuners are common solutions to compensate for manufacturing phase errors and controlling the steering of the output beam. However, active phase-shifters are hard to scale due to their power consumption, thermal cross talk between tuners, and a large number of electronic controllers. Existing OPAs for lidar do not scale up to large sizes needed for high resolution beams and large field of view. In the case of single-input slab coupler OPA, a number of limitations exist including the need for wider wavelength scan, a large footprint which makes it harder to scale, poor scanning granularity and the need for complicated lasers.

Therefore, there is a need for an OPA beam-steerer that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

A first aspect of the disclosure provides for an optical-phased array (OPA). The OPA includes a star coupler coupled to a plurality of grating couplers. The star coupler includes multiple inputs and multiple outputs, and each output of the star coupler is coupled to a grating coupler of the plurality of grating couplers. The OPA may provide for a compact design, which can be readily scalable.

According to the first aspect, in some embodiments, each output of the star coupler is coupled to a grating coupler of the plurality of grating couplers via an optical delay line of a plurality of optical delay lines, wherein the optical delay line is an optical waveguide. The OPA may provide for a reduced length of the delay waveguides.

According to the first aspect, in some embodiments, the grating coupler is an apodized grating coupler. The apodized grating coupler may allow for a gaussian power distribution. In some embodiments the star coupler comprises a range of 8 to 16 inputs and a range of 50 to 500 outputs.

According to the first aspect, in some embodiments, the length of the plurality of optical delay lines increases monotonically across the plurality of optical delay lines. According to the first aspect, in some embodiments, the OPA further includes an optical switch having a plurality of switch inputs and a plurality of switch outputs, each of the switch outputs being coupled to an input of the star coupler, each of the switch outputs being associated to a scan line of the OPA. The optical switch may provide for using one source of light for providing lights to different inputs of the OPA.

According to the first aspect, in some embodiments, the OPA further includes at least one tunable laser coupled to an input of the star coupler, wherein the tunable laser has a wavelength sweep rate that is associated to a scan sweep rate along a scan line. The multiple tunable lasers may reduce optical loss that may result from the optical switch.

According to the first aspect, in some embodiments, the OPA further includes a frequency modulated continuous wave transceiver wherein the tunable laser is a transmitter source and a local oscillator source of the frequency modulated continuous wave transceiver, and wherein the frequency modulated continuous wave transceiver has a light frequency sweep rate, wherein the frequency sweep rate is equal to the speed of light divided by the wavelength sweep rate. The OPA may allow for implementation of FMCW lidar using the OPA, since the FMCW frequency sweep of the laser is the wavelength sweeping used for scanning via the OPA.

According to a second aspect, a method of steering light is provided. The method includes transmitting light from a tunable laser to an input waveguide of a star coupler, the star coupler comprising multiple inputs and multiple outputs, the multiple outputs having output waveguides. The method further includes optically coupling the multiple outputs to a plurality of grating couplers acting as a phased array. The method further includes tuning the wavelength of the light over a wavelength range corresponding to a selected scan line. The method further includes steering the light from the plurality of grating couplers according to a desired scanning pattern. The method may provide for a scalable approach to scanning a field of view.

According to the second aspect, in some embodiments, the light exits the star coupler with an optical phase relationship across the multiple outputs. According to the second aspect, in some embodiments, the method further includes delaying the light from each of the multiple outputs using a plurality of optical delay lines, wherein the optical delay lines are configured to produce a further optical phase relationship across the plurality of grating couplers. In some embodiments, the further optical phase relationship is a linear phase shift. The method may provide for scanning the field of view in a horizontal direction.

According to the second aspect, in some embodiments, the length of the plurality of optical delay lines increases monotonically across the plurality of optical delay lines. According to the second aspect, in some embodiments, least one grating coupler of the plurality of grating couplers is an apodized grating coupler. The method may provide for a for a gaussian power distribution across the grating couplers.

According to the second aspect, in some embodiments, the method further includes selecting an input of the star coupler corresponding to a scan line of a selected sub-field-of-view. In some embodiments, the method further includes directing, via an optical switch, the light to the selected input of the star coupler, wherein the optical switch is coupled to the multiple inputs of the star coupler. The method may provide for scanning a portion of the field view.

According to the second aspect, in some embodiments, the method further includes transmitting light to a second input of the multiple inputs, wherein the transmitting light to a second input comprises directing, via the optical switch, the light to the second input, wherein the second input corresponds to a different scan line of the selected sub-field-of-view. The method may provide for scanning another portion of the field view.

According to the second aspect, in some embodiments, the method further includes coupling a laser to one of the multiple inputs. In some embodiments, the method further includes emitting a beam of light by the OPA at an angle corresponding to the wavelength of the laser.

According to the second aspect, in some embodiments, the transmitting light from a laser to multiple input waveguides of a star coupler in turn comprises directing the light to the multiple inputs in turn to emit interleaved scan lines to scan a sub-field of view. The method may provide for scanning, portion by portion, the sub-field of view.

According to the second aspect, in some embodiments, the tuning the wavelength of the light includes continuous tuning of the wavelength of the light. In some embodiments, the tuning of the wavelength of the light further includes sweeping frequency of the light in a frequency modulated continuous wave distance-ranging method, the wavelength of the light being inversely related to the frequency of the light. The method may provide for scanning (tuning the wavelength) and FMCW sweeping (sweeping frequency).

According to the second aspect, in some embodiments, the continuous tuning of the wavelength of the light includes tuning the wavelength of the light up then down such that the frequency of the light sweeps correspondingly down then up and the light steers correspondingly one way across the desired scanning pattern then the other way across the desired scanning pattern. The method may further provide for determining position and velocity of a target within the field of the view.

Another aspect of the disclosure provides for an optical-phased array (OPA). Such an OPA includes a star coupler coupled to a plurality of grating couplers, wherein the star coupler comprises multiple inputs and multiple outputs. In some embodiments, each output of the star coupler is coupled to a grating coupler of the plurality of grating couplers. In some embodiments, the star coupler is coupled to the plurality of grating couplers by a plurality of optical delay lines. In some embodiments, each output of the star coupler is coupled to a grating coupler of the plurality of grating couplers via an optical delay line of the plurality of optical delay lines. In some embodiments, the optical delay line is an optical waveguide. In some embodiments, the optical waveguide supports a single spatial mode per polarization. In some embodiments, the grating coupler is an apodized grating coupler. In some embodiments, wherein the star coupler comprises a range of 8 to 16 inputs and a range of 50 to 500 outputs. In some embodiments, the length of the plurality of optical delay lines increases monotonically across the plurality of optical delay lines. In some embodiments, the OPA further includes an optical switch coupled to the multiple inputs of the star coupler. In some embodiments, the optical switch is a selector switch comprising a tree of optical switch elements. In some embodiments, the OPA further includes at least one tunable laser coupled to the optical switch. In some embodiments, the optical switch is configured to select one or more inputs of the multiple inputs to send light.

Another aspect of the disclosure provides a method of steering light. Such a method includes transmitting light from a laser to multiple input waveguides of a star coupler, the star coupler comprising multiple inputs and multiple outputs, the multiple outputs having output waveguides. Such a method further includes optically coupling the multiple outputs to a plurality of grating couplers acting as a phased array. Such a method further includes tuning wavelength of the light over a wavelength range corresponding to a selected sub-field-of-view. Such a method further includes steering the light from the plurality of grating couplers according to the desired scanning pattern. In some embodiments, the method further includes delaying the light from each of the multiple outputs using a plurality of optical delay lines. In some embodiments, the length of the plurality of optical delay lines increases monotonically across the plurality of optical delay lines. In some embodiments, the optical delay lines are configured to produce an optical phase relationship across the plurality of grating couplers. In some embodiments, the optical phase relationship is a linear phase shift. In some embodiments, the light exits the star coupler with an optical phase relationship across the multiple outputs. In some embodiments, at least one grating coupler of the plurality of grating couplers is an apodized grating coupler. In some embodiments, the method further includes: selecting an input of the star coupler corresponding to the sub-field-of-view; and directing, via an optical switch, the light to the selected input of the star coupler, wherein the optical switch is coupled to the multiple inputs of the star coupler. In some embodiments, the light is provided via at least one tunable laser. In some embodiments, the method further includes transmitting light to a second input of the multiple inputs, wherein the transmitting light to a second input comprises directing, via the optical switch, the light to the second input. In some embodiments, the light from each of the selected inputs is steered to a different portion of the sub-field-of-view. In some embodiments, the method further includes choosing the sub-field-of-view according to a desired scanning pattern. In some embodiments, the steering the light from the plurality of grating couplers according to the desired scanning pattern comprises scanning, by portion, the sub-field-of-view. In some embodiments, the scanning, by portion, the sub-field-of-view comprises directing the light to the multiple inputs in turn. In some embodiments, the method further includes coupling a laser to one of the multiple inputs and emitting a beam of light by the OPA at an angle corresponding to the wavelength of the laser. In some embodiments, transmitting light from a laser to multiple input waveguides of a star coupler includes directing the light to the multiple inputs in turn to emit interleaved scan lines to scan the field of view. In some embodiments a scan line may scan across an angle that is subtended from the OPA. In other embodiments a scan line may comprise a plurality of segments that may be parallel.

An aspect of the disclosure provides optical-phased array (OPA). Such an OPA includes a star coupler coupled to a plurality of grating couplers, wherein the star coupler comprises multiple inputs and multiple outputs. In some embodiments, each output of the star coupler is coupled to a grating coupler of the plurality of grating couplers. In some embodiments, the star coupler is coupled to the plurality of grating couplers by a plurality of optical delay lines. In some embodiments, each output of the star coupler is coupled to a grating coupler of the plurality of grating couplers via an optical delay line of the plurality of optical delay lines. In some embodiments, the optical delay line is an optical waveguide. In some embodiments, the optical waveguide supports a single spatial mode per polarization. In some embodiments, the grating coupler is an apodized grating coupler. In some embodiments, the star coupler comprises a range of 8 to 16 inputs and a range of 50 to 500 outputs. In some embodiments, the length of the plurality of optical delay lines increases monotonically across the plurality of optical delay lines. In some embodiments, the OPA further includes an optical switch coupled to the multiple inputs of the star coupler. In some embodiments, the optical switch is a selector switch comprising a tree of optical switch elements. In some embodiments, the OPA further includes at least one tunable laser coupled to the optical switch. In some embodiments, the optical switch is configured to select one or more inputs of the multiple inputs to send light.

Another aspect of the disclosure provides a method of steering light. Such a method includes transmitting light from a laser to multiple input waveguides of a star coupler, the star coupler comprising multiple inputs and multiple outputs, the multiple outputs having output waveguides. Such a method further includes optically coupling the multiple outputs to a plurality of grating couplers acting as a phased array. Such a method further includes tuning a wavelength of the light over a wavelength range corresponding to a selected sub-field-of-view. Such a method further includes steering the light from the plurality of grating couplers according to the desired scanning pattern. In some embodiments, the method further includes delaying the light from each of the multiple outputs using a plurality of optical delay lines. In some embodiments, the length of the plurality of optical delay lines increases monotonically across the plurality of optical delay lines. In some embodiments, the optical delay lines are configured to produce an optical phase relationship across the plurality of grating couplers. In some embodiments, the optical phase relationship is a linear phase shift. In some embodiments, the light exits the star coupler with an optical phase relationship across the multiple outputs. In some embodiments, at least one grating coupler of the plurality of grating couplers is an apodized grating coupler. In some embodiments, the method further includes: selecting an input of the star coupler corresponding to the sub-field-of-view; and directing, via an optical switch, the light to the selected input of the star coupler, wherein the optical switch is coupled to the multiple inputs of the star coupler. In some embodiments, the light is provided via at least one tunable laser. In some embodiments, the method further includes transmitting light to a second input of the multiple inputs, wherein the transmitting light to a second input comprises directing, via the optical switch, the light to the second input. In some embodiments, the light from each of the selected inputs is steered to a different portion of the sub-field-of-view. In some embodiments, the method further includes choosing the sub-field-of-view according to a desired scanning pattern. In some embodiments, the steering the light from the plurality of grating couplers according to the desired scanning pattern comprises scanning, by portion, the sub-field-of-view. In some embodiments, the scanning, by portion, the sub-field-of-view comprises directing the light to the multiple inputs in turn. In some embodiments, the method further includes coupling a laser to one of the multiple inputs; and emitting a beam of light by the OPA at an angle corresponding to the wavelength of the laser. In some embodiments, transmitting light from a laser to multiple input waveguides of a star coupler includes directing the light to the multiple inputs in turn to emit interleaved scan lines to scan the field of view.

Embodiments have been described above in conjunctions with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 8 illustrates a method of steering light, according to an embodiment of the present disclosure.

It will be noted that throughout the appended drawings, like features are identified by like reference numerals.

DETAILED DESCRIPTION

As mentioned, beam-steering may be used in a number of applications. Beam-steering may be an essential requirement for automotive lidar. Beam-steering may also be used for security monitoring of buildings, for scanning objects in a manufacturing plant, or other applications where lidar can create useful images. Solid-state OPA beam-steerers have a number of advantages over macro- or micro-mechanical scanners. These advantages include chip-scale dimensions, adaptive FOV, adaptive sweep rate, reliability and low-cost manufacturing. Hybrid systems including the integration of laser, waveguide OPA, detector and digital signal processor (DSP) may achieve a compact lidar system. Herein, a waveguide OPA may be an OPA primarily constructed in optical waveguides, such as in a photonic integrated circuit (PIC).

A waveguide OPA may be configured as an emitting device which emits light from a source into a field of view, or a collecting device which collects light from a field of view, or a device that both emits and collects light. For brevity, we describe an emitting device, but it should be understood that by operating the device in reverse it may serve as a collecting device, and by operating the device in both directions it may serve as both an emitting device and a collecting device. Alternatively, an emitting device and a collecting device may be implemented as separate OPA but disposed within the same apparatus.

Waveguide OPA may comprise an array of grating couplers which emit light. The relative phase of light into grating couplers may determine a steering angle of a beam from the array of grating couplers. Thus, this array of grating couplers is the phased array region of an overall OPA. The OPA may use many individual elements to distribute optical power into the many emitting grating couplers. The power fraction and phase of each path may require precise controlling. Distributors reported may include serpentine, tree and accumulative structures, using Y-junctions, directional couplers and multi-mode interferometers (MMIs). For good beam quality, a Gaussian power distribution may be needed across the array of grating coupler arms. A slab coupler may naturally and reproducibly create a Gaussian distribution of optical power at its output, thereby removing the need for splitting tree.

The passive photonic integrated circuit (PIC) OPA architectures may avoid many control issues. A PIC may refer to the generic term for an optical waveguide chip. The passive OPA device may scan in 2D using a tunable laser. In the vertical direction, scanning may arise from the diffraction of the grating couplers. In the horizontal direction, scanning may arise from the linear phase change with wavelength due to the arm-to-arm length increment in the arrayed waveguide delay region. However, such a passive device may not scale to a large number of grating coupler arms, as needed for a low divergence output.

Figure 1:
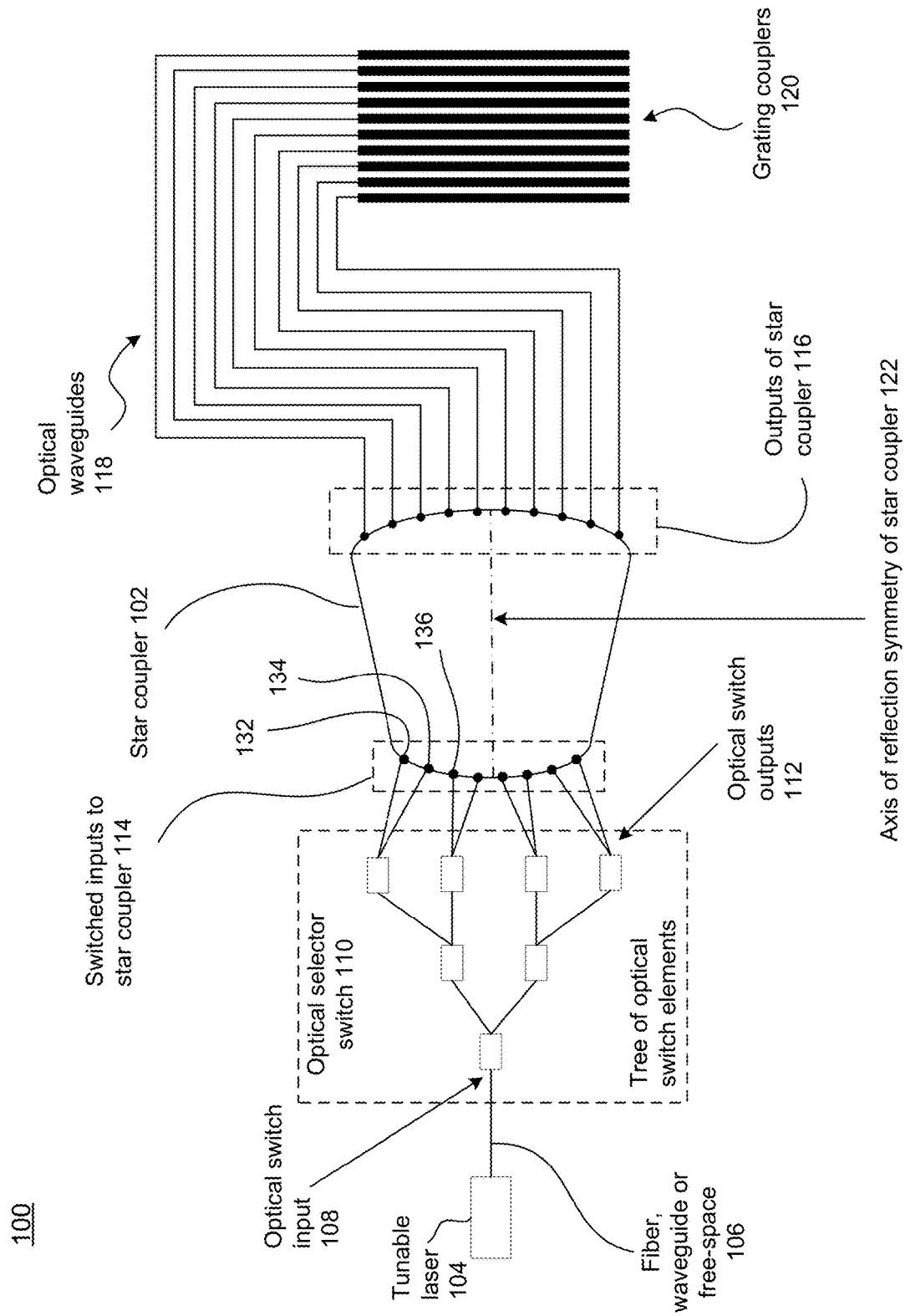
FIG. 1 illustrates an OPA beam-steerer apparatus according to an embodiment of the present disclosure.

FIG. 1 illustrates an OPA beam-steerer apparatus according to an embodiment of the present disclosure. The OPA beam-steerer 100, which may also be referred to as a star coupler OPA, or the apparatus, may comprise one or more of: a tunable laser 104, a 1-to-N optical selector switch 110, a star coupler 102 with multiple N input ports 114 and multiple P outputs ports 116, each output going to an optical waveguide 118, optionally including a delay line, that leads to an optical grating coupler 120. A person skilled may appreciate the star coupler 102 and the grating coupler 120 are passive, whereas the tunable laser 104 and the optical selector switch 110 may be controllable. Each solid connecting line in the figure may represent an optical waveguide. The tunable laser 104 may be coupled into the input 108 of the optical switch 110 via a fiber, waveguide or free-space 106. The grating coupler 120 may emit light out of the chip in which the apparatus may be implemented.

The star coupler 102 may further comprise a free-space slab propagation region. Typically, there may be a cyclical phase relationship between the inputs 114 and outputs 116. The star coupler 102 may be referred to as a multi-input slab coupler or a multi-input multi-output slab coupler. The number P of outputs 116 may be larger than the number N of inputs 114. The number of inputs and outputs may vary, for example, the star coupler 102 may comprise a range of 8 to 16 inputs 114, and a range of 50 to 500 outputs 116. A person skilled in the art may appreciate that different number of inputs and outputs may be used depending on the application.

As illustrated, the apparatus 100 may have upon each output arm of the multiple outputs 116 of the star coupler 102 a delay waveguide 118 followed by a grating coupler 120. An output of the star coupler may comprise a waveguide that supports only a single spatial mode per polarization. The light within the free-space slab propagation region of the star coupler 102 may be a wide optical beam that impinges upon multiple outputs 116 and excites light within each output 116 by means of an overlap between the wide optical mode and the single spatial mode of each output 116. The output 116 may support only a single spatial mode per polarization. Embodiments described herein may further provide for an array of delay waveguides disposed respectively on each output of the star coupler. The delay waveguide may comprise a waveguide that supports only a single spatial mode per polarization. The apparatus may operate in a single polarization.

As illustrated, multiple inputs 114 may be used for the star coupler 102. The star coupler 102 may produce an essentially linear phase shift across the star coupler outputs, with the sign and magnitude of the linear phase shift depending upon the particular input used. In other words, the optical phase difference between the light at the star coupler outputs 116 is determined by which input 114 to the star coupler 102 receives light. The multiple inputs and linear phase change may provide for an additional degree of freedom for implementing an OPA.

Accordingly, the star coupler OPA 100 may provide for a higher density than an OPA using only a single-input type slab couplers. A multi-input star coupler OPA 100 may provide for adjusting the sign and magnitude of the linear phase shift according to the input used. As may be appreciated by a person skilled in the art, the laser wavelength tuning range and the maximum length of a delay waveguide are proportional to the number of points in the field of view that must be addressed from a given phase shift. Accordingly, the star coupler OPA 100 may provide for a more flexible wavelength tuning range and reduced length of delay lines since multiple inputs may be used to address the points in the filed view. Thus, the star coupler OPA 100 may exploit the change in output optical phase shift from a star coupler when the position of the input is changed. As mentioned, the required wavelength tuning range and/or the maximum length of delay line are greatly reduced.

As illustrated, the tunable laser 104 may direct light to one of the inputs 114 of the star coupler 102 by means of the 1-to-N selector switch 110. The optical selector switch 110 may be implemented as a tree of 1×2 switch elements, as illustrated, such as a Mach-Zehnder switch. Alternatively, other optical switches may be used such as micro-electromechanical system (MEMS) crossbar switches. The optical selector switch 110 may comprise an optical switch input 108 for receiving laser light from the tunable laser 104, via a fiber, waveguide or free-space 106. The optical selector switch 110 may further comprise multiple optical switch outputs 112 for directing light to the inputs 114 of the star coupler 102.

In some embodiments, the selector switch 110 may be integrated on the PIC before the star coupler 102, to direct the laser 104 to the required input 114. A person skilled in the art may appreciate the use of selector switch in PIC technology. The star coupler OPA 100 may further be integrated with a 1×8 selector switch at the input. In an example embodiment, the star coupler may have 8 inputs, which may provide for a density that is 8 times better than the existing comparable single-input device.

The optical waveguides 118 may be implemented as a set of delay lines having progressively longer length, as illustrated. Each optical delay line waveguide connects from one output 116 of the star coupler 102 to one grating coupler 120 of the OPA region.

The set of grating couplers 120 may emit light out of the plane, the light which may be steered to scan a field of view (FOV). Scan may refer to changing the angle of the transmitted or received optical beam or both. FOV may refer to the angular region over which a device, such as the star coupler OPA can scan. The FOV may have a horizontal and a vertical direction. The horizontal and vertical directions of the FOV may reflect, but not necessarily, the horizontal and vertical directions, respectively, in the real world. 2D FOV may refer to 2-dimensional field of view spanning horizontal and vertical directions. The horizontal and vertical directions may be at 90 degrees to each other, or the horizontal and vertical directions may be at a skewed angle to each other. Referring to FIG. 1, 2, 3, 4, 5, 6, 9, the vertical direction may be up-down in the figure, and the horizontal direction may be left-right. Note that the vertical and horizontal directions only apply with respect to the grating couplers 120, 302, 306, 920 and the field of view 500, 600. All the other elements may have arbitrary orientation.

Referring to FIG. 1, a light may enter the star coupler 102 from one or more inputs 114 and exit from one or more output 116. In an embodiment, the optical selector switch 110 may be configured to direct or permit light to enter the star coupler 102 from input 132. The light may exit the star coupler 102 with an optical phase shift relationship across the outputs 116. The light may then pass through the plurality of optical waveguides 118 (which may be delay lines) having a gradually increasing length as illustrated. In other words, the length of the plurality of optical delay lines increases monotonically across the plurality of optical delay lines. The variably delayed optical waveguides 118 may accordingly produce an optical phase relationship across the inputs to the grating couplers 120. The optical phase relationship across the inputs to the grating couplers 120 may depend upon the relative lengths and refractive indices of the optical waveguides 118, the optical phase relationship across the outputs 116, and the wavelength of the laser 104. The grating couplers 120 each may emit light, and in the far field (i.e., at a distance from the apparatus that is much larger than the dimensions of the grating couplers 120), these emitted lights interfere by means of the phased array effect to produce a set of beams separated by their angle of emission in the horizontal direction. There may be one beam or more than one beam. In a preferred embodiment there may be only 1 beam within the field of view at all times. The angle of emission in the horizontal direction of these beams depends upon the optical phase shift relationship across the inputs to the grating couplers. Thus, when the wavelength is then scanned, the beam may be steered in the horizontal direction.

Further, when the wavelength is scanned, the light emitted from the grating couplers 120 may have an angle of emission in the vertical direction that depends upon the wavelength, and the period and refractive index of the grating coupler, as may be appreciated by a person skilled in the art. Thus, the beam may also be steered in the vertical direction by changing the wavelength of the laser. Hence, the beam may be steered simultaneously in the horizontal and vertical directions to address a field of view or a part of the field of view. Such scanning may take the form of scan lines which may sparsely cover the overall field of view but with gaps between the scan lines.

The optical selector switch may be then be configured to direct or permit light enter the star coupler 102 from another input 114, for example input 136. The change in input may change the optical phase relationship across the outputs 116, thus changing the relative optical phase at the inputs to the grating couplers 120, which may change the angle of emission in the horizontal direction so as to illuminate a different part of the field of view. Each different input 114 may direct light to different scan lines that interleave, so that the aforementioned gaps between scan lines are filled in as each input 114 is used. Thus, the entirety of the field of view may be scanned. A person skilled in the art may appreciate that multiple inputs 114 to the star coupler 102 may provide for improved density and lead to reduced apparatus size. In the interleaving pattern, the location of the scan line may vary across the field of view monotonically with the selection of the input 114. In other words, if the light is directed from one input 134 to an adjacent input 136, the scan line may move to an adjacent line of the interleaving pattern. Alternatively, the interleaving pattern may vary randomly or may vary in a cyclic manner with the selection of the input 114.

Apparatus 100 may be actuated by the combination of two mechanisms. The first mechanism may be the controllable or configurable optical selector switch 110 and the second mechanism may be the tunable laser 104. Accordingly, the apparatus 100 may be actuated via combing the switching and wavelength tuning. During the switch scanning, the switch may send or direct light to one of the inputs 114 of the star coupler 102. The choice of this input may determine the optical phase tilt across the outputs of the star coupler. The optical phase tilt may also appear across the array of optical grating couplers 120, resulting in steering (for example in the X direction) the beam.

Apparatus 100 may provide for a 2D steering using a waveguide star coupler OPA. Apparatus 100 may further provide for a reduced footprint which may be 8 times smaller than a single-input type of comparable resolution and FOV. The star coupler OPA may function by scanning in lines or patterns as described elsewhere herein. The star coupler OPA may create or provide for a Gaussian profile in the horizontal direction, without needing directional couplers to distribute the optical power. In the vertical direction, scanning may arise from the diffraction of the grating couplers. In the horizontal direction, scanning may arise from the linear phase change with wavelength due to the arm-to-arm length increment in the arrayed waveguide delay region. The star coupler OPA may be passive and readily scalable.

Figure 2:
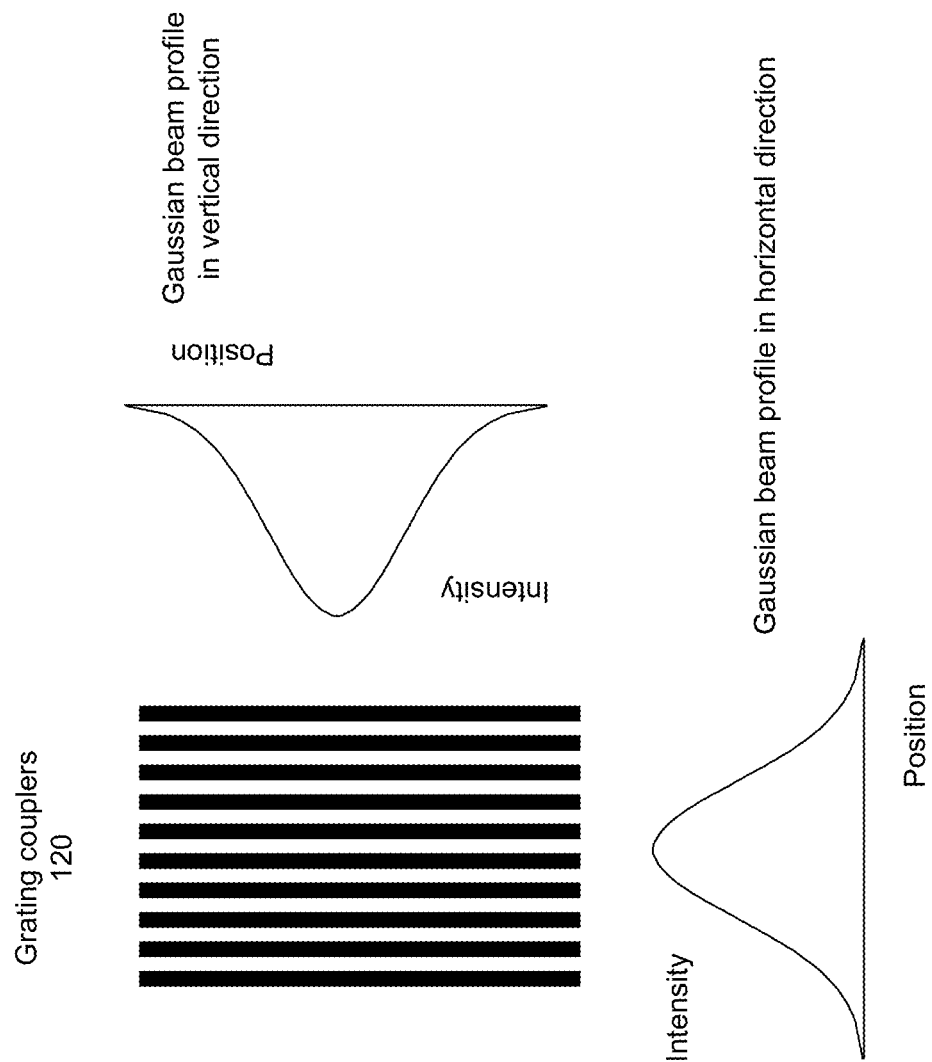
FIG. 2 illustrates optical power cross-section profiles for the apparatus in FIG. 1, according to an embodiment of the present disclosure.

FIG. 2 illustrates optical power cross-section profiles for the apparatus in FIG. 1, according to an embodiment of the present disclosure. Referring to FIG. 2, the preferred optical power cross-section of the optical beam emitted by the apparatus 100 may be a Gaussian profile in the horizontal direction and a Gaussian profile in the vertical direction as shown. A person skilled in the art may appreciate that a Gaussian beam may have the lowest divergence of any beam from a given sized emitting region, and thus a Gaussian beam may achieve an improved scanning resolution. The vertical and horizontal widths may be the same or different, depending on the desired horizontal resolution and vertical resolution of the apparatus 100.

In an embodiment, the star coupler 102 may create a Gaussian profile in the horizontal direction by means of the diffraction of light from an input 114 of the star coupler 102 through the slab waveguide region of the star coupler 102. The Gaussian profile may propagate to the output face of the star coupler 102 where each of the star coupler outputs 116 samples a region of the output profile. The relative optical power across the plurality of delay line waveguides 118 may thus have a Gaussian profile. This Gaussian profile may be delivered to the inputs of the grating couplers 120, and thus the relative optical power into the plurality of grating couplers 120 may also have a Gaussian profile. Each of the grating couplers 120 may emit the same fraction of the optical power that they respectively carry. Thus, a Gaussian profile may be created in the horizontal direction.

In an embodiment, the center of the array of output waveguides 116 is centered on an axis of reflection symmetry 122 of the star coupler 102. This axis of reflection symmetry 122 is illustrated by the dashed line in FIG. 1. Thus, the Gaussian intensity profile created by the star coupler 102 is centered on the set of delay line waveguides 118. Due to the curved input face and curved output face of the star coupler 102 (as shown in FIG. 1), this Gaussian intensity profile centered on the set of delay line waveguides 118 may be achieved when any of the input waveguides 114 is illuminated, including in particular input waveguides that are not on the axis of reflection symmetry 122. The center of curvature of the input face may be positioned on or close to the output face, and the center of curvature of the output face may be positioned on or close to the input face.

Figure 3A:
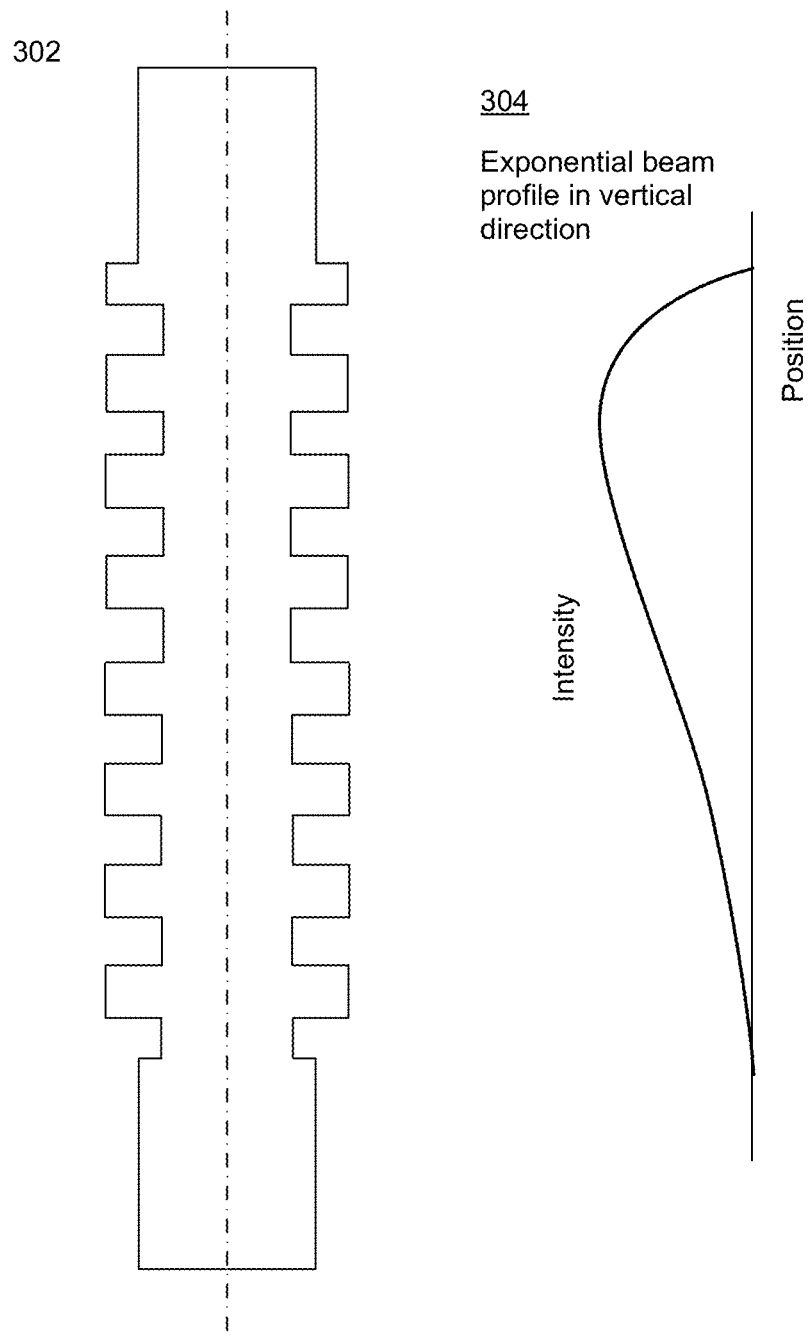
FIG. 3A illustrates a uniform grating coupler, according to an embodiment of the present disclosure.

FIG. 3A illustrates a uniform grating coupler, according to an embodiment of the present disclosure. In an embodiment, each grating coupler 120 may be a uniform grating coupler 302 having a uniform structure patterned along its length, where its length is in the vertical direction as shown in FIG. 3. Advantageously, the uniform structure may be the simplest structure to fabricate and may offer improved tolerance to fabrication variations. However, such a uniform structure may create an optical power cross-section along the vertical direction that has an exponential beam profile 304 as illustrated. Such an optical beam may have poor divergence compared to a Gaussian beam of comparable size.

Figure 3B:
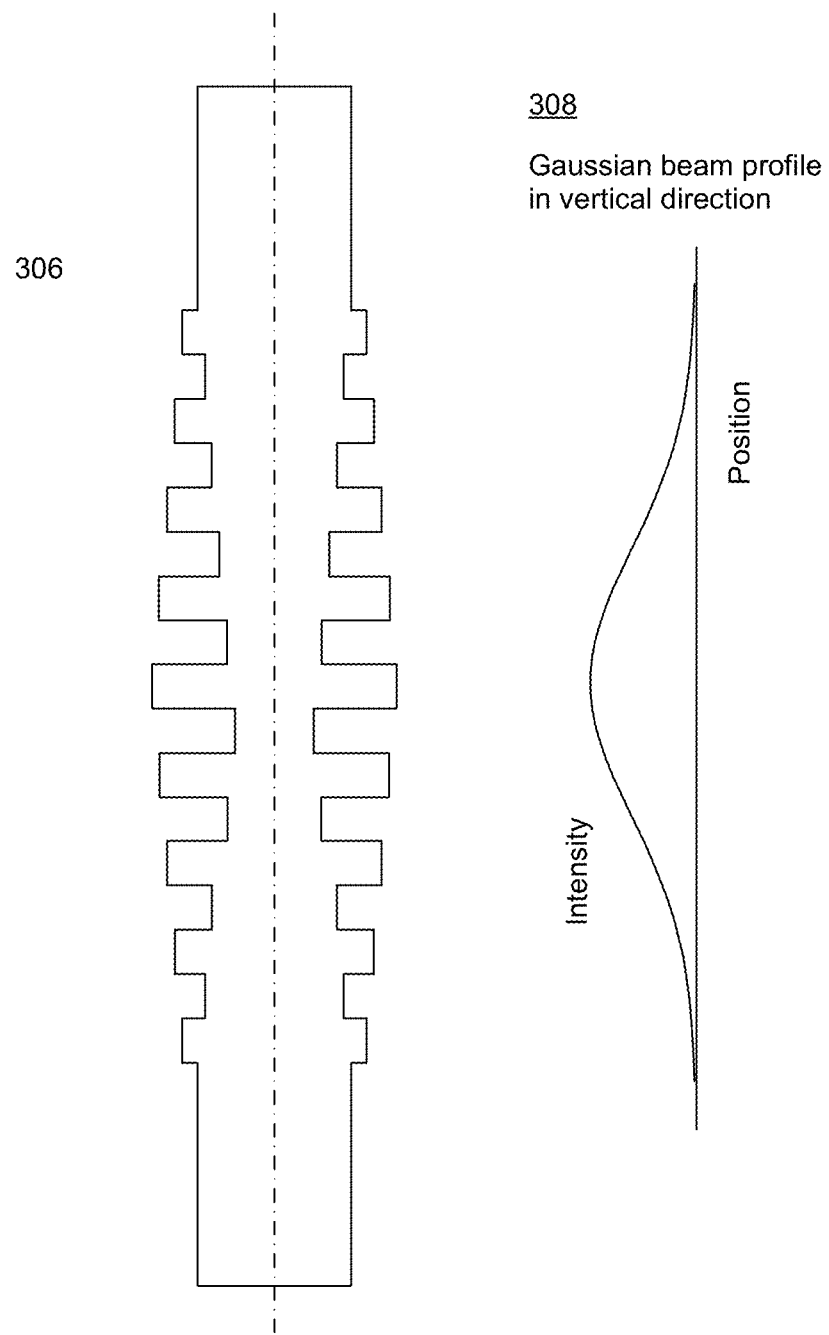
FIG. 3B illustrates an apodized grating coupler, according to an embodiment of the present disclosure.

FIG. 3B illustrates an apodized grating coupler, according to an embodiment of the present disclosure. In a preferred embodiment, each grating coupler 120 may be an apodized grating coupler 306 having an apodized structure patterned along its length as illustrated. Apodized may indicate that the strength of the grating patterning varies along the length of the grating coupler such that more light is emitted from approximately half-way along the grating coupler, and less light near its end. Thus, the emitted beam may have a profile along the vertical direction that is essentially Gaussian 308. For example, the apodized grating coupler 306 may comprise lateral patterning of a waveguide core region, where greater lateral extent of the patterning creates stronger emission. Thus in FIG. 3B, the lateral extent of the patterning may vary along the length of the grating coupler 306.

A person skilled in the art may appreciate that there are various apodized and non-apodized grating couplers 120 that may exist and be used in the embodiments herein, including grating couplers having vertical patterning whose depth or lateral extent may vary along the grating coupler, grating couplers having multiple layers, and grating couplers comprising multiple different materials having different refractive indices. The grating couplers may all be identical or may be different to each other.

Figure 4:
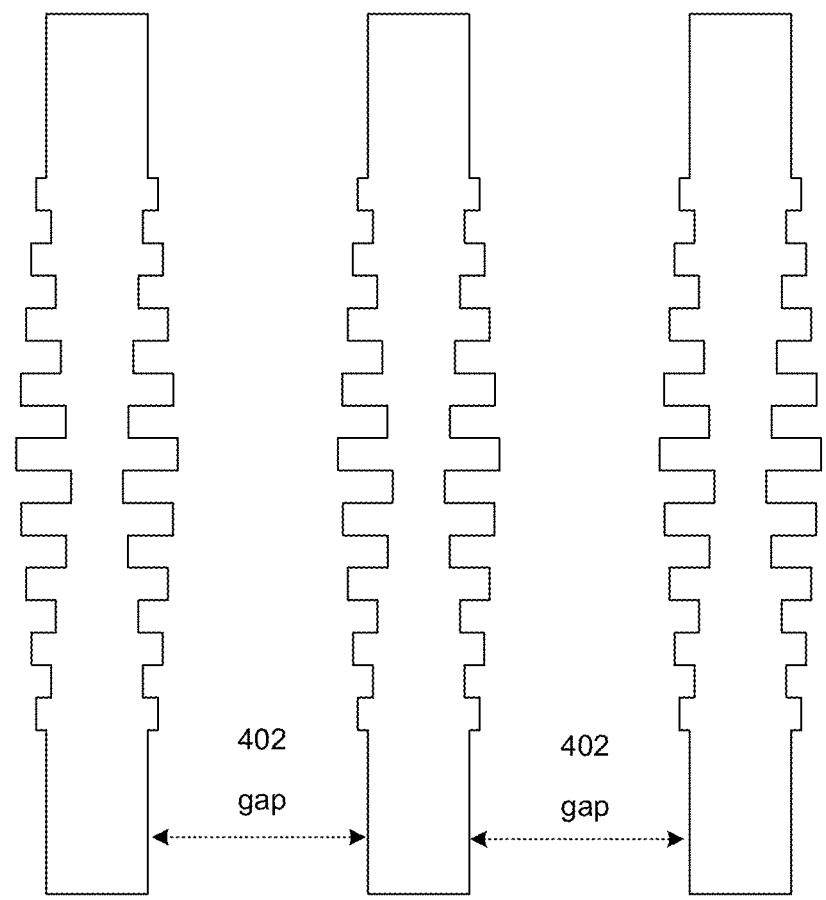
FIG. 4 illustrates arrangement of the grating couplers according to an embodiment of the present disclosure.

FIG. 4 illustrates arrangement of the grating couplers according to an embodiment of the present disclosure. The number (three) of grating couplers 120 shown in FIG. 4 is for illustrative purposes as a person skilled in the art may appreciate that number of grating couplers may vary as appropriate. The grating couplers 120 may be arranged with a gap 402 separating each grating coupler from its neighbors as illustrated. In an embodiment the gap 402 may be 6 µm. The number of grating couplers 120 may be similar to the number P of outputs 116 of the star coupler 102. A person skilled in the art may appreciate that as the wavelength is changed, the light may be steered in the vertical direction due to diffraction by each grating. Accordingly, when the wavelength is changed, since an array of grating couplers is used, the array of grating couplers forms an OPA which steers the light in both the horizontal direction and vertical direction. Thus, the relationship between the grating couplers may be the OPA effect and within each grating coupler, there is the diffracted effect of the grating.

Accordingly, using the star coupler 102 and the apodized grating coupler 306 in their respective horizontal and vertical directions, embodiments provide for emitting a beam that has a Gaussian profile in both the horizontal and vertical directions.

Figure 5:
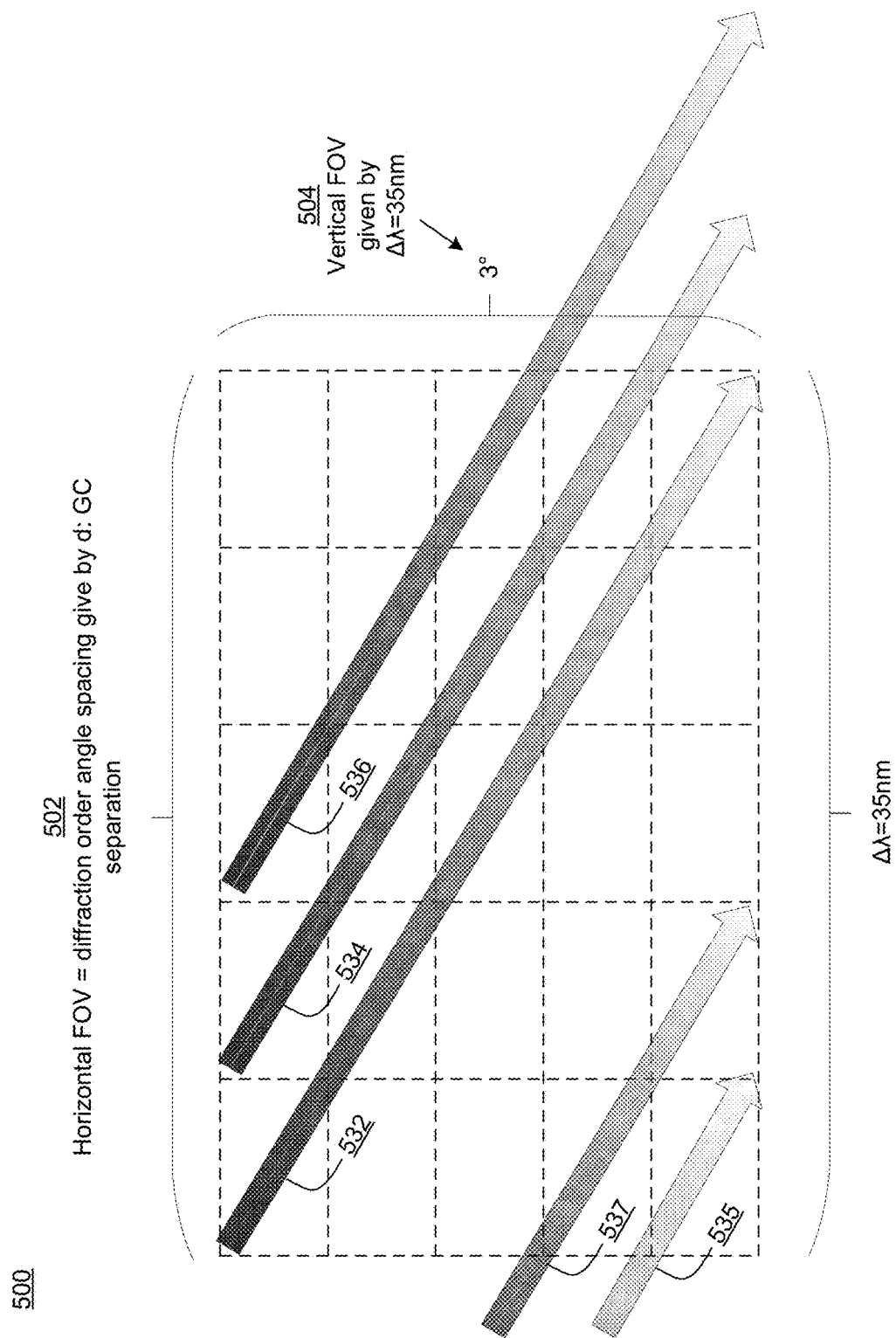
FIG. 5 illustrates a scanning pattern of the field of view according to an embodiment of the present disclosure.

FIG. 5 illustrates a scanning pattern of the field of view according to an embodiment of the present disclosure. A two dimensional field of view 500 of the scanning beam is shown having a horizontal field of view (H FOV) 502 and a vertical field of view (V FOV) 504. The OPA effect produces multiple diffraction orders in the horizontal direction, with the horizontal angular space of the diffraction orders given by d: grating coupler separation. In some embodiments, the H FOV may be defined as an angular region that contains exactly one OPA diffraction order for all states of the apparatus. The V FOV may be based on the period within each grating and the wavelength sweep range ($\Delta\lambda$), which may be, for example, 35 nm in infrared for 3° as illustrated. The two dimensional field of view may be for a lidar application.

In an embodiment, the optical selector switch may be configured to direct or permit light to enter the star coupler 102 through, for example, input 132 for scanning the FOV. As laser 104 is tuned, or otherwise the light color or wavelength is changed smoothly, for example from red to blue light (higher wavelength to lower wavelength), the beam exiting the grating couplers 120 may scan the FOV 500 according to the pattern 532 as illustrated. The change in wavelength is illustrated in the FIG. 5 via the gradient scale from black to white. As illustrated the beam may scan in a diagonal pattern across the FOV 500. The change of color from red to blue may refer to the wavelength range which may be typically in the infrared, in the case of lidar application.

A person skilled in the art may appreciate that the pattern of scanning, for example pattern 532, is based on the continuous smooth change in wavelength of the light. Pattern 532 may be called a scan line. The gradient shown, for example in pattern 532, may illustrate a smooth change in wavelength along the pattern (across the FOV).

When the input 132 scan is complete, the laser may be switched to input 134. The light selector switch may be configured to direct or permit light enter the star coupler 102 through input 134. The beam exiting the grating coupler 120 corresponding to input 134 may scan the FOV according to pattern 534 and 535. Pattern 534 and 535 together may comprise a scan line having 2 segments which may be parallel. As illustrated the beam may scan the FOV according to pattern 534 and when the scanning exits the FOV the beam wraps around returns to the FOV and continues scanning according to pattern 535 as illustrated. The wrap around may correspond to the next order of OPA emission entering the FOV.

Similarly, when the light selector switch is configured to direct or permit light enter the star coupler 102 through input 136. The beam exiting the grating coupler 120 corresponding to the input 136 may scan the FOV 500 according to pattern 536 and 537. Pattern 536 and 537 together may comprise a scan line having 2 segments which may be parallel. It will be appreciated that the pattern formed by 532, 534, 535, 536, 537 comprises an interleaved scan, wherein scan lines associated to different inputs of the star coupler 102 are interleaved. The angular separation between interleaved scan lines is proportional to the linear phase shift created by changing the selected input of star coupler 102. In an embodiment, the position of the interleaved scan lines varies monotonically with the selection of inputs 132, 134, 136. In another embodiment, linear phase shift created by changing the selected input of star coupler 102 is larger, and therefore the position of the interleaved scan line jumps across a plurality of scan line positions as the selection of inputs 132, 134, 136 is varied.

As illustrated in FIG. 5, for input 134 and 136, there is a mid-scan jump up to the OPA lobe. A linear phase front across the slab outputs may be achieved from each input. Therefore, when the input is moved in the input plane, the beam may be steered in the horizontal direction. Moreover, during the wavelength sweep, the beam using input 134 and 136 illustrates a parallel trajectory to that using input 132, and also accomplishes the interlaced filling of the complete scene due to the cyclic behavior of the OPA with its diffraction orders.

The number of lines per input may be referred to as $N_{cycle}$ and the wavelength scan range for a full horizontal sweep may be $\Delta\lambda/N_{cycle}$. $N_{cycle}$ may refer to the number of OPA lobes used during a wavelength scan, and $\Delta\lambda=35$ nm may be an example of the full tuning range. Since the star coupler 102 may have N number of inputs, the total number of lines may be $N_m*N_{cycle}$. For a star coupler of 8 inputs, the wavelength range may be 8 times wider than a wavelength range of a single-input design. Accordingly, the differential waveguide length $\Delta L$ for the delay lines may be 8× smaller than for compared to a single-input slab coupler. The longest delay line may be 8× shorter, which may greatly reduce footprint and optical loss.

Sweep as used herein may be continuous, piece-wise continuous, or discrete. Piecewise continuous is a standard mathematics term, meaning a function whose value, for example the wavelength, varies smoothly over a sub-domain, for example a tuning parameter from a control system. The value of the function may then jump to a new smoothly varying sub-domain. In some embodiments, the wavelength-scanning may be a continuous up-down sweep without a discrete dwell-time, i.e., a smooth sweep. In other embodiments, the wavelength scanning may be performed step-wise, with a discrete dwell-time at each output angle (for example, jumping from one wavelength to another). The nature of wavelength scanning (continuous or step-wise) may be based on the type of laser.

Figure 6:
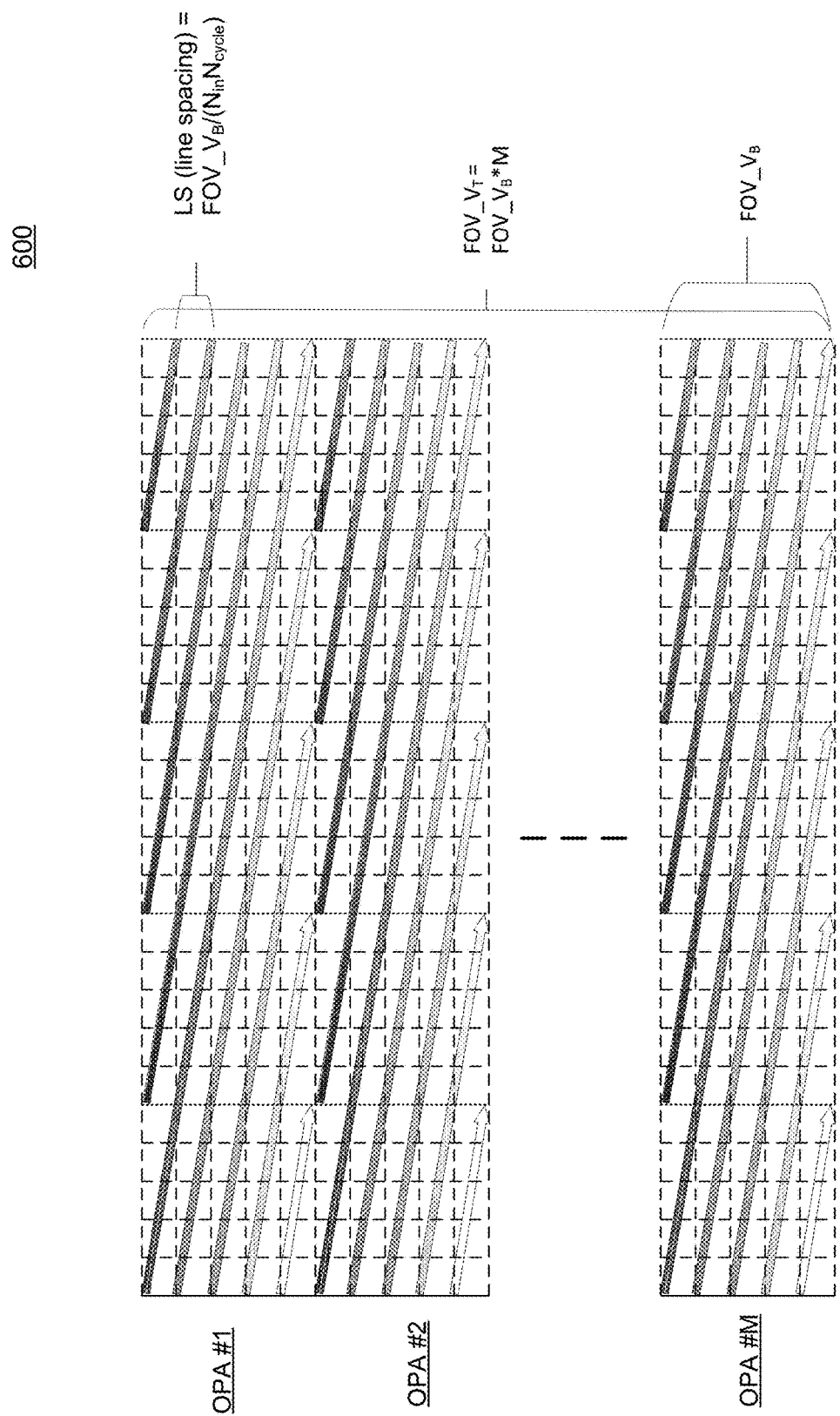
FIG. 6 illustrates a large FOV based on combining sub-FOVs according to an embodiment of the present disclosure.

In an embodiment, the apparatus may have only one star coupler and the entire FOV may comprise a single sub-FOV. Alternatively, FIG. 6 illustrates a large FOV based on sub-FOVs according to an embodiment of the present disclosure. The FOV 600 may comprise a number of sub-FOVs for multiple and separate star coupler OPAs on a chip as illustrated. Multiple instances of the star coupler, delay waveguides and grating couplers may be disposed to achieve a larger overall field of view, for example FOV 600. The field of view of each such instance may abut or may overlap. The increased number of star coupler OPAs may provide for enlarging the FOV as illustrated. Accordingly, the wavelength scanning is performed along a larger FOV as illustrated. Each OPA may have a FOV equivalent to $FOV\_V_B$ as illustrated. Line spacing between each the scanning pattern of each input may be equivalent to $LS=FOV\_V_B/(N_{in}N_{cycle})$ as illustrated. The total FOV 600 may be based on M number of OPA's as may be required and configured. Accordingly, the FOV 600 may be equivalent to: $FOV\_V_T=FOV\_V_B*M$ as illustrated.

Figure 7:
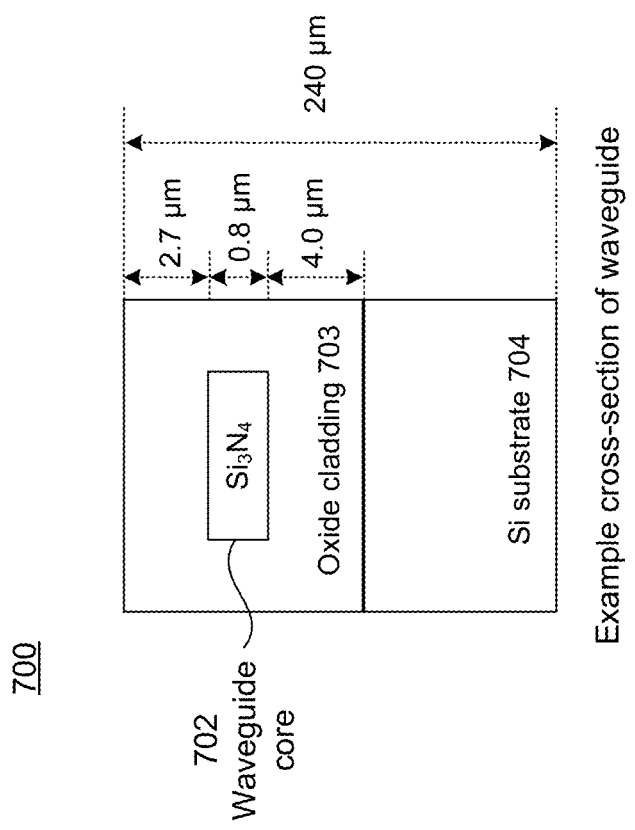
FIG. 7 illustrates an example cross-section of a waveguide, according to an embodiment of the present disclosure.

FIG. 7 illustrates an example cross-section of a waveguide, according to an embodiment of the present disclosure. The waveguide 700 may comprise a waveguide core 702 which may be silicon nitride material. The waveguide 700 may further comprise a cladding layer 703 which may be an oxide material. Waveguide 700 may further comprise a substrate 704 which may be a silicon material. A person skilled in the art may appreciate that waveguide 700 is not limited to the illustrated design and materials and other appropriate designs and materials may be used.

FIG. 8 illustrates a method of steering light, according to an embodiment of the present disclosure. The method 800 may include, at 802, transmitting light from a laser to multiple input waveguides of a star coupler, the star coupler comprising multiple inputs and outputs, the outputs having output waveguides. The method may further include, at 804, selecting or choosing a sub-field-of-view of a beam-steerer according to a desired scanning pattern. The method may further include, at 812, optically coupling the multiple outputs to a plurality of grating couplers acting as a phased array. The method may further include, at 814, tuning the wavelength of the light over a wavelength range corresponding to the sub-field-of-view. The method may further include, at 816, steering light from the plurality of grating couplers according to the desired scanning pattern. The method may then continue from 804 as illustrated.

In some embodiments, at 806, the method may further include selecting an input of the star coupler corresponding to the sub-field-of-view. In some embodiments, at 808, the method may further include directing, via an optical switch, the light to the selected input of the star coupler, wherein the optical switch is coupled to the multiple inputs of the star coupler. In some embodiments, at 810, the method may further include delaying the light from each of the multiple outputs using a plurality of delay lines.

In some embodiments, length of the plurality of optical delay lines increases monotonically across the plurality of optical delay lines. In some embodiments, the optical delay lines are configured to produce an optical phase relationship across the plurality of grating couplers. In some embodiments the optical phase relationship is a linear phase change. In some embodiments the light exits the star coupler with an optical phase relationship across the multiple outputs. In some embodiments, each grating coupler of the plurality of grating couplers is an apodized grating coupler. In some embodiments, the light is provided via at least one tunable laser. In some embodiments, the light from each of the selected inputs is steered to a different portion of a field of view.

Embodiments provide for a star coupler comprising a slab region, a plurality of inputs, and a plurality of outputs. The star coupler may require a distinct design to achieve a required phase relationship. In some embodiments the star coupler may be coupled to an array of delay waveguides disposed respectively on each output of the plurality of output of the star coupler.

In some embodiments, the structure of the apparatus 100 may be replicated having multiple apparatus devices sharing a single laser. This may be done by adding additional preliminary stages of beam-splitting or switching (not shown) between the laser 104 and the optical selector switch 110. Thus, a given laser may drive more than one star coupler OPA device simultaneously (with beam-splitter) or non-simultaneously (with switching). Each star coupler OPA device may be configured to address a sub-field of the FOV. This embodiment may allow for one laser to address a larger overall FOV, at the cost of more complexity, larger chip area and diminished image quality. The poorer image quality arises (with beam-splitting) due to less optical power per scan line or (switching) due to less dwell-time per scan line.

In some embodiments, scanning mechanisms may be combined. Switching mechanisms may provide for coarse scanning, while wavelength tuning may provide fine scanning. These mechanisms may be particularly useful for adaptive FOV, where a sub-field of view may be selected via switching mechanism to concentrate on a particular region of interest. In an alternate embodiment, wavelength tuning may provide for coarse scanning and switching may provide for fine scanning, by appropriate selection of the design parameters. In some embodiments, wavelength scanning may be a continuous up-down sweep without a discrete dwell-time. Wavelength scanning may also be performed stepwise, with a discrete dwell-time at each output angle.

An optical-phased array may refer to a device that uses control of optical phase to steer an output beam (OPA used in a transmitter) or to capture input light from a particular direction (OPA used in receiver). While some embodiments may refer to an OPA that emits light, for example in the case of a transmitter, a person skilled in the art may appreciate that an OPA may also be used to collect light in a receiver. Accordingly, embodiments may apply to OPA that both emit and collect light and, and therefore may be used simultaneously in a transmitter and receiver.

When used as in an OPA receiver, the direction of light propagation may be reversed. For example, referring to FIG. 1, when used as a receiver embodiment, the same figure may be referenced as an OPA receiver, but the definition of input and output are reversed, the switch may be redefined as, for example, an 8×1 selector switch, and the laser may be replaced by an optical detector or receiver. In a receiver embodiment, the field of view may be illuminated by the laser as a wide-angle beam or a steered beam, by means of optical components such as lenses, mirrors and beam-steerers. As may be appreciated by a person skilled in the art, the laser may need not be scanned in an OPA receiver.

Figure 9:
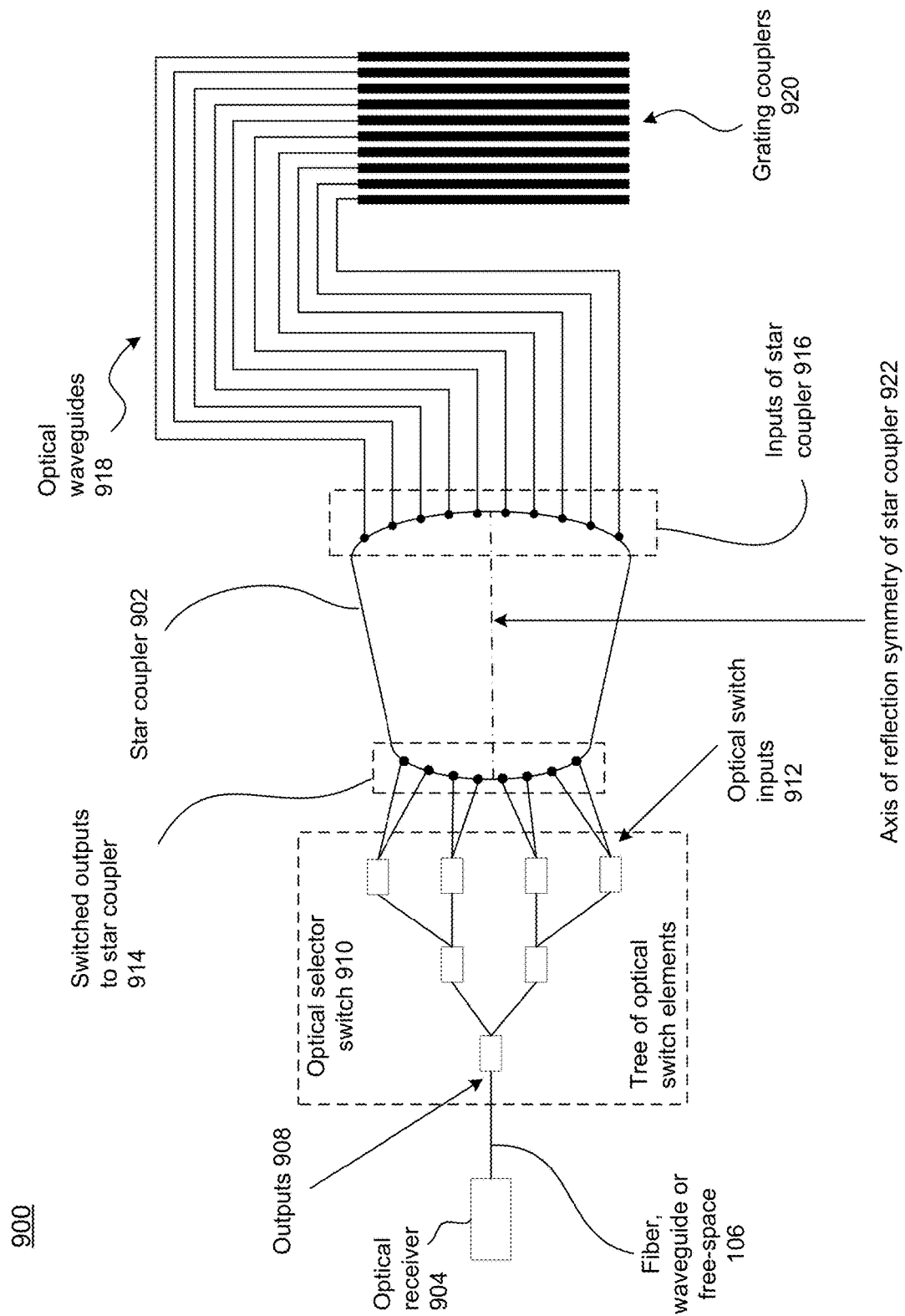
FIG. 9 illustrates an OPA beam-steerer apparatus configured as a steerable optical receiver, according to an embodiment of the present disclosure.

FIG. 9 illustrates an OPA beam-steerer apparatus configured as a steerable optical receiver, according to an embodiment of the present disclosure. The OPA beam-steerer apparatus 900 may comprise a star coupler 902 with multiple inputs 916 and multiple outputs 914. As may be appreciated by a person skilled in the art, the number of inputs 916 of the star coupler is typically larger than the number of outputs 914, as illustrated. The star coupler 902 may have an axis of reflection symmetry 922. There may be a laser (not shown) associated to the OPA receiver, wherein the laser illuminates the field of view or a portion of the field of view. The laser may be a tunable laser. The laser may scan in the horizontal and/or vertical direction. The scanning of the laser may be synchronized to the scanning of the OPA receiver.

The multiple inputs 916 may be coupled to optical waveguides (which may optionally be configured as delay lines) 918 leading from grating couplers 920 as illustrated. The multiple outputs 914 may be coupled to an optical selector switch 910, which may be implemented as a tree of 1×2 switch elements, as illustrated. The optical selector switch 910 may include one or more optical switch inputs 912 and outputs 908. The optical selector switch 910 may be coupled to an optical receiver or detector 904, via a fiber, waveguide or free-space 106, as illustrated.

The laser associated to an OPA receiver may be a tunable laser that scans in angle in the same manner as for a transmitter OPA. In an embodiment comprising a separate transmitter OPA and receiver OPA, wherein at least one of them has a multi-input star coupler and the same laser may be used for both transmit and receive. In an alternative embodiment, the OPA may serve as both transmitter and receiver OPA such that the emission and collection of light is always in a same direction. Such an implementation may be known as a co-axial system. In a co-axial system, the Transmitter and the receiver may both be scanned and synchronized. Although, the co-axial system may, in principle be an option, a person skilled in the art may appreciate that in practice the co-axial system may be difficult to make as the optimum design for a receiver may not be the same as for a transmitter.

In some embodiments, each input 114 of the star coupler 102 may be driven by a separate laser. In some embodiments, all lasers may be on simultaneously, in other embodiments, some or a set of the lasers may be on simultaneously, or the lasers may all be on one at a time. Such embodiments may be advantageous as they may avoid the optical loss of the selector switch.

In another embodiment, simultaneously activated lasers may have different wavelengths. A receiver may distinguish these wavelengths by means of beating with a reference laser or by means of an optical wavelength filter, and thereby allowing multiple regions of the field of view to be imaged simultaneously.

Scanning may refer to angular scanning across a field of view. In regard to the star coupler OPA, scanning may be in 2 angular dimensions which, without loss of generality, may be called horizontal and vertical. As may be appreciated by a person skilled in the art, these horizontal and vertical dimensions may be oriented at any angle relative to the world, and may be orthogonal or not, depending on what a lidar system designer may wish to detect. Indeed, in embodiments described herein, the scanning may not be interpreted as exactly orthogonal as the horizontal scanning is tilted. Further, a signal processing system may project and interpolate the scan onto any desired spatial grid.

Figure 10:
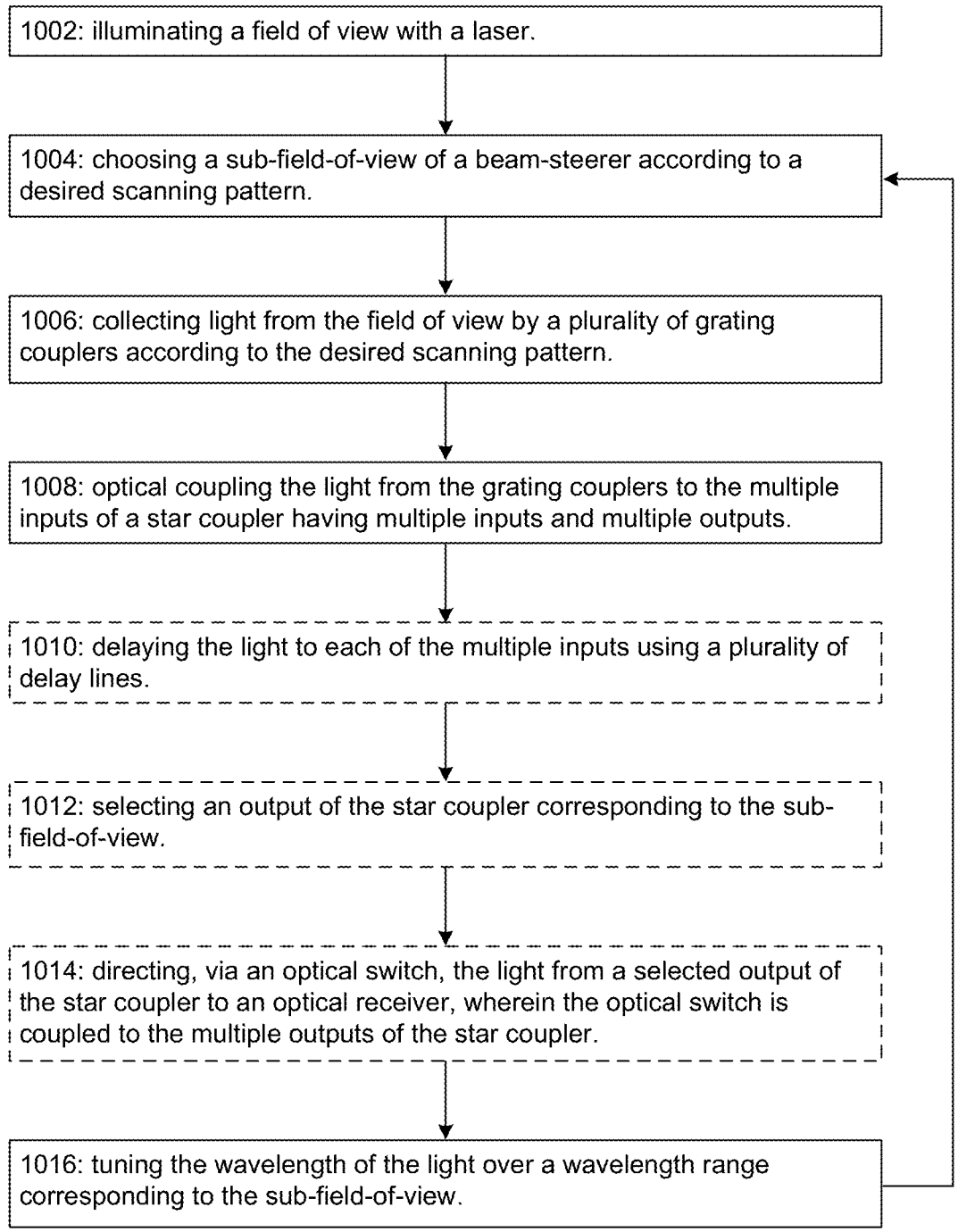
FIG. 10 illustrates a method of collecting and receiving light in a steerable manner, according to an embodiment of the present disclosure.

FIG. 10 illustrates a method of collecting and receiving light in a steerable manner, according to an embodiment of the present disclosure. The method 1000 may include, at 1002, illuminating a field of view with a laser. The method may further include, at 1004, choosing a sub-field-of-view of a beam-steerer according to a desired scanning pattern. The method may further include, at 1006, collecting light from the field of view by a plurality of grating couplers according to the desired scanning pattern. The method may further include, at 1008, optical coupling the light from the grating couplers to the multiple inputs of a star coupler having multiple inputs and multiple outputs. The method may further include, at 1016, tuning the wavelength of the light over a wavelength range corresponding to the sub-field-of-view.

In some embodiments, at 1010, the method may further include delaying the light to each of the multiple inputs using a plurality of delay lines. In some embodiments, at 1012, the method may further include selecting an output of the star coupler corresponding to the sub-field-of-view. In some embodiments, at 1014, the method may further include directing, via an optical switch, the light from a selected output of the star coupler to an optical receiver, wherein the optical switch is coupled to the multiple outputs of the star coupler.

A frequency modulated continuous wave (FMCW) lidar may refer to a form of frequency swept lidar where the frequency of light emitted is swept while the lidar looks in particular direction. The star coupler OPA may be compatible with FMCW. The star coupler OPA uses wavelength sweeping with a sweep rate that may be compatible with FMCW sweeping. More broadly, FMCW sweeping may be used with any type of OPA that uses wavelength tuning to effect at least one dimension of its scan, including but not limited to the disclosed apparatus. The FMCW frequency sweep of the laser may be the wavelength sweeping used to scan the beam from the OPA. Since using wavelength tuning may be very time-consuming to step to a new wavelength in a discrete manner, embodiments provide for implementing FMCW lidar when using an OPA. Accordingly, a continuous sweeping may be more practical to use for overcoming the time consumption issue.

Embodiments may provide for a method of performing scanning (which may also be known as beam-steering) and FMCW sweeping using an OPA beam-steering apparatus. The method may comprise sweeping the laser wavelength (and thus the laser frequency) so as to scan the output beam by means of OPA effects of the apparatus and simultaneously using the sweep of the laser wavelength as the frequency sweep of the FMCW source. The laser wavelength sweep may be used for FMCW lidar, in mode-hop-free parts of the sweep. The method may apply to any OPA that uses wavelength sweeping to achieve scanning. A person skilled in the art may appreciate that sweeping frequency and sweeping wavelength are equivalent, but inverse. Accordingly, the method may provide for achieving, simultaneously, angular sweeping and FMCW sweeping.

FMCWs may sweep the laser frequency up then down (or, without loss of generality, down then up). Such sweeping implementation may improve the ability of the lidar to measure position and velocity of a target. Embodiments may provide for scanning in space along a scan line due to wavelength increasing, and similarly, scanning in the opposite direction along the scan line due to wavelength decreasing and coupling the scanning with frequency modulation effect required for FMCW.

Accordingly, embodiments may provide for achieving the FMCW sweep down-and-up at the same time as scanning. Use of this up-down feature may be optional in some embodiments.

The star coupler OPA mechanism may provide for implementing an FMCW sweep as described herein. Wavelength sweeping used to steer an OPA may also simultaneously sweep the laser frequency to implement an FMCW sweep.

A person skilled in the art may appreciate that simultaneous sweeping of laser frequency to implement an FMCW sweep via wavelength sweeping used to steer an OPA may be applied more broadly and is not limited to the star coupler OPA. This concept of simultaneous sweeping may also apply to, for example, the single-input slab coupler OPA which is another waveguide OPA. The concept may also apply to the surface-type non-waveguide OPA, provided laser wavelength as a scanning mechanism is used. In other words, FMCW sweep may be derived from wavelength scanning of field of view for any OPA that uses wavelength scanning including but not limited to the star coupler OPA.

Embodiments described herein may provide for using the phased array with an FMCW signal, so as to make a lidar having both FMCW detection capability and scanning.

The FMCW effect may provide ranging that measures distance to a target and may measure the velocity of the target. As is known to those skilled in the art, an FMCW lidar can comprise a light source having a swept light frequency, wherein a portion of the light is emitted toward a target and a portion acts as a local oscillator that is mixed with light that is reflected by the target and received by the lidar, to create a frequency beat signal that gives the instantaneous frequency shift between the emitted and received light. The FMCW measurement technique is that the range to the target is calculated from the observed instantaneous frequency shift between the emitted and received light together with the known laser light frequency sweep rate. Further, by scanning the frequency down then up, the relative velocity of the target may also be measured. These FMCW principles are described in Li, Y., & Ibanez-Guzman, J. (2020) "Lidar for autonomous driving: The principles, challenges, and trends for automotive lidar and perception systems", IEEE Signal Processing Magazine, 37(4), 50-61.

Figure 11A:
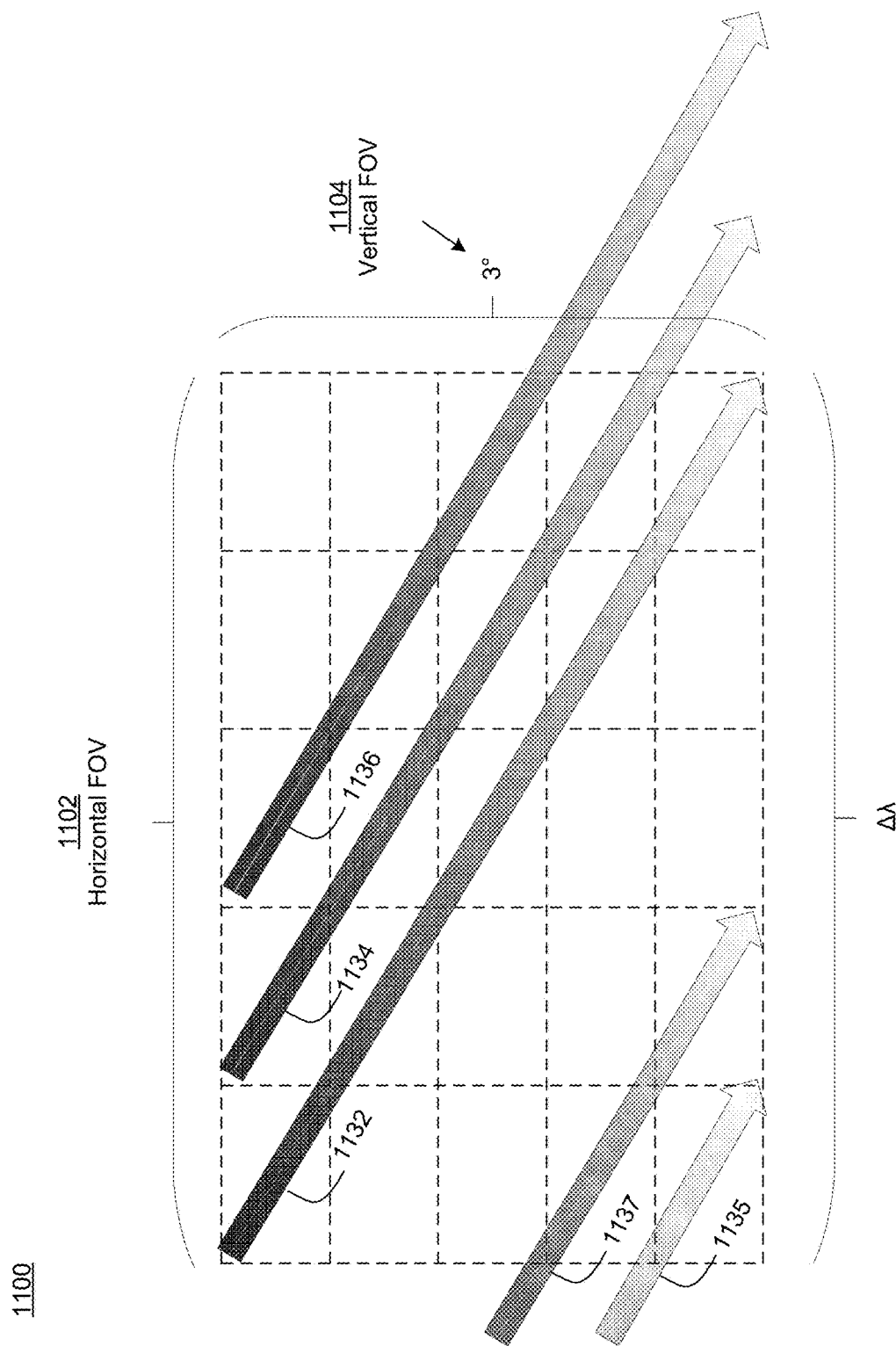
FIGS. 11A and 11B illustrate simultaneous performing of beam steering and frequency modulated continuous wave (FMCW) sweeping for lidar range finding, according to an embodiment of the present disclosure.
Figure 11B:
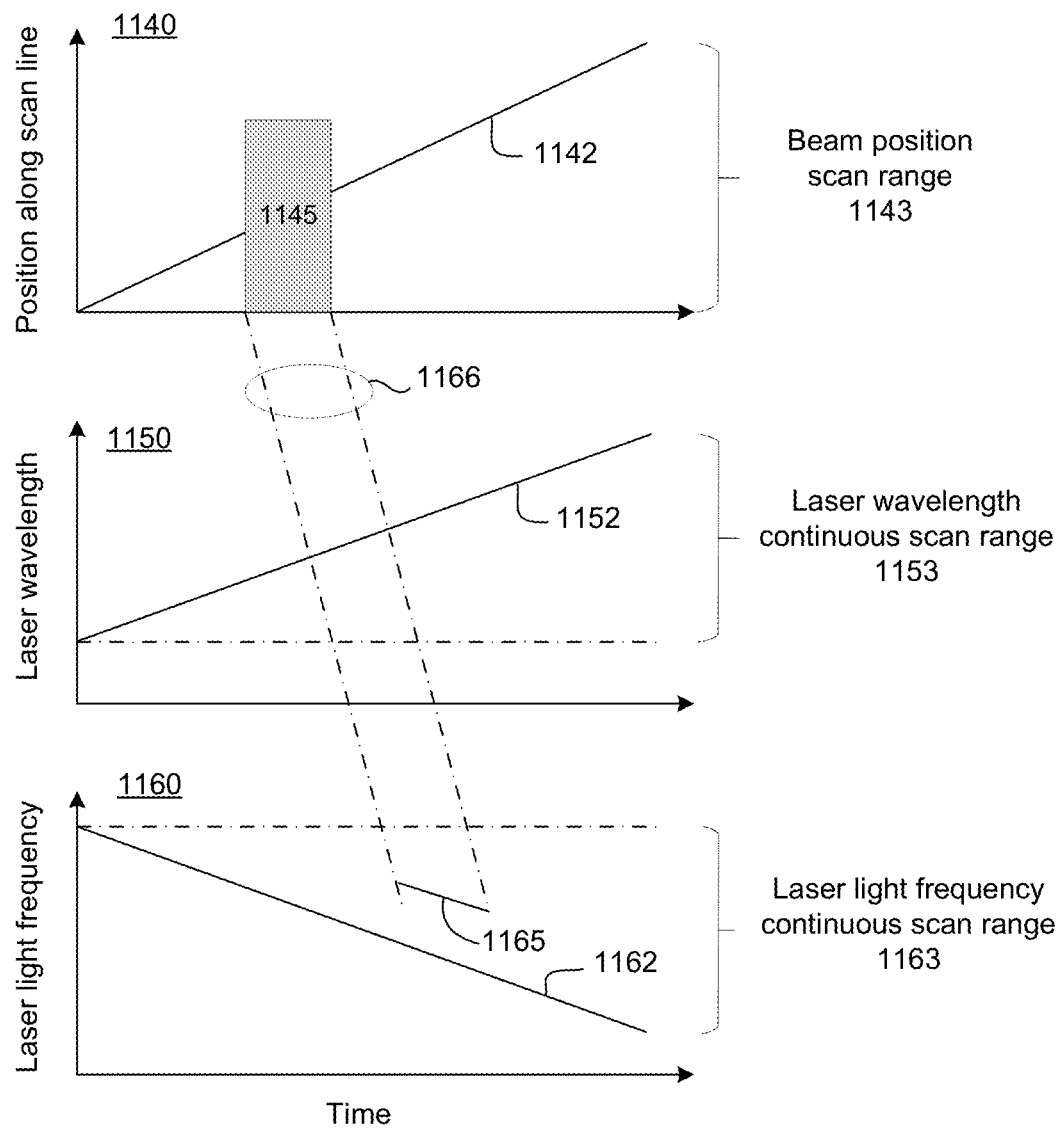

FIGS. 11A and 11B illustrate example of scanning and FMCW sweeping using an OPA beam-steering apparatus, according to an embodiment of the present disclosure. As may be appreciated by a person skilled in the art, scanning can also refer to beam-steering. Referring to FIG. 11A, elements 1100, 1102, 1104, 1132, 1134, 1135, 1136, 1137 can correspond respectively to elements 500, 502, 504, 532, 534, 535, 536, 537 from FIG. 5. Referring to FIG. 11B, graphs 1140, 1150, 1160 illustrate the simultaneous steering and FMCW behavior when scanning along the scan line 1132 of FIG. 11A. Graphs 1140, 1150, 1160 all have the same time axis.

Graph 1140 indicates a position 1142 of the beam versus time as the beam is scanned along the scan line 1132 according to a scan sweep rate. The beam position scan range is shown as 1143. In an embodiment, a target of finite spatial extent can be present at position 1145 of the scan line 1132. In this illustration, the target 1145 is only present within a distinct small field of view, and thus is only illuminated for a fraction of the total scan time.

Graph 1150 illustrates the laser wavelength 1152 versus time as the light scans, wherein the laser wavelength is swept continuously as the light scans according to a laser wavelength sweep rate. The laser wavelength continuous scan range is shown as 1153.

Graph 1160 illustrates the corresponding laser light frequency versus time. The frequency of emitted light 1162 is illustrated in comparison with the frequency of the received light 1165. The frequency of emitted light 1162 has a light frequency sweep rate. The frequency of received light 1165 represents the frequency of light after it has been reflected from a target 1145. Diagonal lines 1166 represent a round-trip time-of-flight as the received light is received after it is emitted, due to the time of flight from the apparatus to the target 1145 and back. The received light is only present for a time duration corresponding to when the emitted light was pointing at the target 1145, offset by the round-trip time of flight. The laser light frequency continuous scan range of the emitted light is shown as 1163.

In an embodiment, the frequency difference between emitted light frequency 1162 and received light frequency 1165 can be measured by beating the tunable laser with the received light and using a signal processing system (not shown) to perform the FMCW range calculation. Accordingly, both the angular position of the target and the range of the target can be determined.

Similar graphs may be plotted for the other scan lines 1134 with 1135, and 1136 with 1137, and will similarly detect targets at any place along those scan lines.

An aspect of the disclosure provides for an optical-phased array (OPA). The OPA includes a star coupler coupled to a plurality of grating couplers, wherein the star coupler comprises multiple inputs and multiple outputs. In some embodiments, the OPA includes at least one tunable laser coupled to the optical switch.

In some embodiments, the OPA further includes a frequency modulated continuous wave transceiver wherein the tunable laser is a transmitter source and a local oscillator source of the frequency modulated continuous wave transceiver.

In some embodiments, the tunable laser has a wavelength tuning rate for the beam-steering apparatus that is equal to speed of light divided by frequency sweep rate for the frequency modulated continuous wave transceiver apparatus.

In some embodiments, the tunable laser tunes alternately up in wavelength then down in wavelength and the frequency modulated continuous wave transceiver correspondingly sweeps down in frequency then up in frequency.

Another aspect of the disclosure may provide for an optical phased array comprising a tunable laser and at least one diffractive element, wherein the tunable laser is a transmitter source and a local oscillator source of a frequency modulated continuous wave transceiver.

Another aspect of the disclosure may provide for a method of steering light. The method includes transmitting light from a tunable laser to multiple input waveguides of a star coupler, the star coupler comprising multiple inputs and multiple outputs, the multiple outputs having output waveguides. The method further includes optically coupling the multiple outputs to a plurality of grating couplers acting as a phased array. The method further includes tuning wavelength of the light over a wavelength range corresponding to a selected sub-field-of-view. The method further includes steering the light from the plurality of grating couplers according to the desired scanning pattern.

In some embodiments, the tuning wavelength of the light steers the light in the desired scanning pattern by means of diffraction of a phased array of the star coupler. In some embodiments, the tuning wavelength of the light comprises: continuous tuning of the wavelength of the light; and sweeping frequency of the light in a frequency modulated continuous wave distance-ranging method, the wavelength of the light being inversely related to the frequency of the light. In some embodiments, the continuous tuning of the wavelength of the light includes tuning the wavelength of the light up then down such that the frequency of the light sweeps correspondingly down then up and the light steers correspondingly one way across the desired scanning pattern then the other way across the desired scanning pattern Embodiments of the present invention can be implemented using electronics and/or photonics hardware, software, or a combination thereof. In some embodiments, the invention is implemented by one or multiple computer processors executing program instructions stored in memory. In some embodiments, the invention is implemented partially or fully in hardware, for example using one or more field programmable gate arrays (FPGAs) or application specific integrated circuits (ASICs) to rapidly perform processing operations.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. An optical-phased array (OPA) beam-steerer comprising:
   an optical switch comprising a switch input to receive light, the optical switch further comprising a plurality of switch outputs, the optical switch configured for selecting any one of the switch outputs and for directing the light to the selected switch output, the light having associated thereto an optical phase and a wavelength;

a star coupler (SC) comprising a plurality of SC inputs and a plurality of SC outputs, the SC inputs each coupled to a different switch output of the plurality of switch outputs to receive the light from the selected switch output, the SC configured to produce an optical phase relationship in the phase of the light at the plurality of SC outputs, the optical phase relationship depending from the selected switch output; and a plurality of grating couplers, the grating couplers each coupled to a different SC output of the plurality of SC outputs to receive the light from the SC outputs, the grating couplers configured to emit a light beam from the light, the light beam having associated thereto a first angle of emission with respect to a horizontal direction in a field of view and a second angle of emission with respect to a vertical direction in the field of view, the first angle of emission depending from the optical phase relationship, the second angle of emission depending from the wavelength.

2. The OPA of claim 1, further comprising a plurality of optical delay lines, the optical delay lines each coupling a different SC output of the plurality of SC outputs to a different grating coupler of the plurality of grating couplers, the optical delay lines each being an optical waveguide.

3. The OPA of claim 2, wherein the length of the plurality of optical delay lines increases monotonically across the plurality of optical delay lines.

4. The OPA of claim 1, wherein each grating coupler is an apodized grating coupler.

5. The OPA of claim 1, wherein the SC comprises 8 to 16 SC inputs and 50 to 500 SC outputs.

6. The OPA of claim 1 further comprising:
at least one tunable laser coupled to an SC input, the tunable laser having associated thereto a wavelength sweep rate that is associated to a scan sweep rate along a scan line of the OPA.

7. The OPA of claim 6, wherein the tunable laser is configured to transmit frequency modulated continuous wave light to the OPA, the tunable laser having associated thereto a light frequency sweep rate, the light frequency sweep rate equating to the speed of light divided by the wavelength sweep rate.

8. The method of claim 1 wherein the optical switch comprises a plurality of inputs.

9. A method of steeringva light beam, the method comprising:
transmitting light from a tunable laser to a switch input of an optical switch, the light having associated thereto an optical phase and a wavelength, the optical switch comprising a plurality of switch outputs, each of the plurality of switch outputs being coupled to a different star coupler (SC) input of a plurality of SC inputs of a SC, the SC comprising a plurality of SC outputs, the SC outputs being each coupled to a different grating coupler of a plurality of grating couplers;
selecting a particular switch output of the plurality of switch outputs, the particular switch output corresponding to an optical phase relationship in the phase of the light at the plurality of SC outputs, the optical phase relationship being produced by the SC;
directing, by the optical switch, light to the particular switch output;
tuning, by the tunable laser, the wavelength of the light;
emitting, by the plurality of grating couplers, the light beam from the light, the light beam having associated thereto a first angle of emission with respect to a horizontal direction in a field of view and a second angle of emission with respect to a vertical direction in the field of view, the first angle of emission depending from the optical phase relationship in the phase of the light at the plurality of SC outputs, the second angle of emission depending from the wavelength.

10. The method of claim 9 further comprising:
delaying the light from each of the plurality of SC outputs using a plurality of optical delay lines, the optical delay lines configured to produce a further optical phase relationship in the phase of the light across the plurality of grating couplers.

11. The method of claim 10, wherein the further optical phase relationship is a linear phase shift.

12. The method of claim 9, wherein the length of the plurality of optical delay lines increases monotonically across the plurality of optical delay lines.

13. The method of claim 9, wherein at least one grating coupler of the plurality of grating couplers is an apodized grating coupler.

14. The method of claim 9 further comprising:
selecting a different switch output corresponding to a second optical phase relationship in the phase of the light at the plurality of SC outputs;
directing, by the optical switch, light to the different switch output.

15. The method of claim 9, wherein the selecting of the particular switch output and the directing, by the optical switch, of light to the particular switch output are repeated in turn to emit interleaved scan lines to scan a sub-field-of-view of the field of view.

16. The method of claim 9, wherein:
the light has associated thereto a frequency, the frequency of the light being inversely related to the wavelength of the light; and
the tuning, by the tunable laser, of the wavelength of the light comprises:
continuous tuning of the wavelength of the light; and
sweeping the frequency of the light in a frequency modulated continuous wave distance-ranging method.

17. The method of claim 16, wherein the continuous tuning of the wavelength of the light comprises:
tuning the wavelength of the light up then down such that the frequency of the light sweeps correspondingly down then up and the light beam steers correspondingly one way then the opposite way.

18. The method of claim 9 wherein the optical switch comprises a plurality of inputs.

* * * * *

UNITED STATES PATENT AND TRADEMARK OFFICE
CERTIFICATE OF CORRECTION

PATENT NO. : 11,914,190 B2
APPLICATION NO. : 17/581045
DATED : February 27, 2024
INVENTOR(S) : Pascual Muñoz Muñoz et al.

It is certified that error appears in the above-identified patent and that said Letters Patent is hereby corrected as shown below:

In the Specification

Column 13, Line 32, "may be $N_m*N_{cycle}$. For a star coupler of 8 inputs, the" should read --may be $N_{in}*N_{cycle}$. For a star coupler of 8 inputs, the--;

In the Claims

Column 21, Lines 48-49, "9. A method of steeringva light beam, the method comprising:" should read --9. A method of steering light beam, the method comprising:--.

Signed and Sealed this
Fourteenth Day of May, 2024

Katherine Kelly Vidal
*Director of the United States Patent and Trademark Office*